(12) United States Patent
Ikemoto et al.

(10) Patent No.: US 10,136,249 B2
(45) Date of Patent: Nov. 20, 2018

(54) INFORMATION DISTRIBUTION APPARATUS AND METHOD

(71) Applicant: HITACHI, LTD., Tokyo (JP)

(72) Inventors: Yu Ikemoto, Tokyo (JP); Masato Utsumi, Tokyo (JP); Tohru Watanabe, Tokyo (JP); Yoshihisa Okamoto, Tokyo (JP); Kengo Ogawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/513,054

(22) PCT Filed: Jul. 24, 2015

(86) PCT No.: PCT/JP2015/071173
§ 371 (c)(1),
(2) Date: Mar. 21, 2017

(87) PCT Pub. No.: WO2017/017740
PCT Pub. Date: Feb. 2, 2017

(65) Prior Publication Data
US 2017/0303079 A1    Oct. 19, 2017

(51) Int. Cl.
*H04W 4/02* (2018.01)
*G06Q 30/02* (2012.01)
*H04W 4/06* (2009.01)

(52) U.S. Cl.
CPC ............. *H04W 4/02* (2013.01); *G06Q 30/02* (2013.01); *H04W 4/06* (2013.01)

(58) Field of Classification Search
CPC .................................. H04W 4/02; H04W 4/06
See application file for complete search history.

(56) References Cited

U.S. PATENT DOCUMENTS 6,377,793 B1    4/2002  Jenkins
8,073,460 B1 *  12/2011 Scofield .................. H04W 4/21
                                                              455/456.1
(Continued)

FOREIGN PATENT DOCUMENTS

JP    2002-199423 A    7/2002
JP    2002-215666 A    8/2002
(Continued)

OTHER PUBLICATIONS

International Search Report dated Oct. 6, 2015 of International Application No. PCT/JP2015/071173.

*Primary Examiner* — Nathan Mitchell
(74) *Attorney, Agent, or Firm* — Volpe and Koenig, P.C.

(57) ABSTRACT

Proposed are an information distribution apparatus and method capable of efficiently distributing information. Clustering processing of collecting time series position data, which is configured from position information of a plurality of mobile communication objects, and classifying the time series position data into a plurality of clusters based on the collected time series position data of each of the mobile communication objects is executed, profiling processing of determining, for each of the clusters, a dominant attribute of each user in which the time series position data was allocated to the relevant cluster based on pre-registered attribute information of each of the users of each of the mobile communication objects is executed, and, for each of the clusters, information to be distributed to each of the users in which the time series position data was allocated to the relevant cluster is determined based on a processing result of the profiling processing.

17 Claims, 28 Drawing Sheets

(56) References Cited

U.S. PATENT DOCUMENTS

| | | | |
|---|---|---|---|
| 9,516,470 B1* | 12/2016 | Scofield | H04W 4/21 |
| 9,661,464 B2* | 5/2017 | Lerenc | H04W 4/023 |
| 9,846,891 B2* | 12/2017 | Rakshit | G06Q 30/0261 |
| 2002/0083043 A1 | 6/2002 | Hoshi et al. | |
| 2003/0096621 A1* | 5/2003 | Jana | G08G 1/0104 |
| | | | 455/456.1 |
| 2004/0192350 A1* | 9/2004 | Pelaez | H04W 4/08 |
| | | | 455/456.3 |
| 2007/0042770 A1* | 2/2007 | Yasui | H04M 3/42229 |
| | | | 455/428 |
| 2007/0224977 A1* | 9/2007 | Yamaguchi | G01S 5/0009 |
| | | | 455/414.2 |
| 2008/0065659 A1 | 3/2008 | Watanabe et al. | |
| 2010/0056175 A1* | 3/2010 | Bachmann | H04W 8/08 |
| | | | 455/456.1 |
| 2011/0021214 A1* | 1/2011 | Nakaji | H04L 41/0893 |
| | | | 455/457 |
| 2011/0035282 A1* | 2/2011 | Spatscheck | G06Q 30/02 |
| | | | 705/14.58 |
| 2012/0108259 A1* | 5/2012 | Weiss | G06Q 30/0261 |
| | | | 455/456.1 |
| 2012/0202428 A1* | 8/2012 | Mirbaha | H04L 12/185 |
| | | | 455/41.2 |
| 2012/0271883 A1* | 10/2012 | Montoya | H04W 4/023 |
| | | | 709/204 |
| 2014/0113674 A1* | 4/2014 | Joseph | H04W 4/021 |
| | | | 455/519 |
| 2015/0382139 A1* | 12/2015 | Omar | G01S 5/0294 |
| | | | 455/456.1 |
| 2016/0105773 A1* | 4/2016 | Wawrowski | H04W 4/029 |
| | | | 455/456.2 |

FOREIGN PATENT DOCUMENTS

| | | |
|---|---|---|
| JP | 2004-069318 A | 3/2004 |
| JP | 2008-070959 A | 3/2008 |
| JP | 2013-250883 A | 12/2013 |
| JP | 2015-049681 A | 3/2015 |

\* cited by examiner

FIG.3

USER POSITION INFORMATION TABLE

| USER ID | ITEM | | VALUE |
|---|---|---|---|
| USER ID = 1 | TIME STAMP | | {2015-01-01 09:00, 2015-01-01 09:05, ...} |
| | POSITION INFORMATION | LATITUDE | {35.451414, 35.451416, ...} |
| | | LONGITUDE | {139.632177, 139.635137, ...} |
| | | POSITION MEASUREMENT ERROR | {10.0m, 10.0m, ...} |
| USER ID = 2 | TIME STAMP | | {2015-01-01 09:00, 2015-01-01 09:05, ...} |
| | POSITION INFORMATION | LATITUDE | {36.451414, 36.451416, ...} |
| | | LONGITUDE | {138.632177, 138.635137, ...} |
| | | POSITION MEASUREMENT ERROR | {50.0m, 40.0m, ...} |
| ... | ... | | ... |

FIG.4

USER CLASSIFICATION INFORMATION TABLE — 25

| CLUSTER ID | ITEM | | VALUE | |
|---|---|---|---|---|
| CLUSTER k = 1 | NUMBER OF SAMPLE USERS | | 4000 | } 25D |
| | SAMPLE USER ID LIST | | {1,2,5,...,6400} | } 25E |
| | CLUSTER CENTROID | LATITUDE | {35.451414, 35.451416, ...} | } 25G  } 25F |
| | | LONGITUDE | {139.632177, 139.635137, ...} | } 25H |
| CLUSTER k = 2 | NUMBER OF SAMPLE USERS | | 3000 | } 25D |
| | SAMPLE USER ID LIST | | {3,4,7,...,4120} | } 25E |
| | CLUSTER CENTROID | LATITUDE | {36.451414, 36.451416, ...} | } 25G  } 25F |
| | | LONGITUDE | {139.632177, 139.635137, ...} | } 25H |
| ... | ... | | ... | |

(A) USER ATTRIBUTE INFORMATION TABLE — 26A

| USER ID | ATTRIBUTE INFORMATION | VALUE |
|---|---|---|
| USER ID = 1 | AGE | 20'S |
| | GENDER | FEMALE |
| | HOME ID | 2 |
| | WORKPLACE ID | 3 |
| | TRANSIT POINT ID | 1 |
| | BROWSING OF ADVERTISEMENT A | YES |
| | BROWSING OF ADVERTISEMENT B | NO |
| USER ID = 2 | AGE | 40'S |
| | GENDER | MALE |
| | HOME ID | 1 |
| | WORKPLACE ID | 2 |
| | TRANSIT POINT ID | 3 |
| | BROWSING OF ADVERTISEMENT A | NO |
| | BROWSING OF ADVERTISEMENT B | YES |
| ... | ... | ... |

26AA  26AB  26AC (B) HOME ID TABLE — 26B

| HOME ID | VALUE |
|---|---|
| 1 | A CITY |
| 2 | B CITY |
| 3 | C CITY |
| ... | ... |

26BA  26BB (C) WORKPLACE ID TABLE — 26C

| WORKPLACE ID | VALUE |
|---|---|
| 1 | A CITY |
| 2 | B CITY |
| 3 | C CITY |
| ... | ... |

26CA  26CB (D) TRANSIT POINT ID TABLE — 26D

| TRANSIT POINT ID | VALUE |
|---|---|
| 1 | A STATION |
| 2 | B STATION |
| 3 | C STORE |
| ... | ... |

CANDIDATE ATTRIBUTE TABLE 27

| ATTRIBUTE ID | ITEM | ATTRIBUTE |
|---|---|---|
| 1 | AGE | {PRE-TEEN, TEENAGERS, 20'S, ..., 90'S OR OLDER} |
| 2 | GENDER | {MALE, FEMALE} |
| 3 | HOME ID | {1,2,3...} |
| 4 | WORKPLACE ID | {1,2,3...} |
| 5 | TRANSIT POINT ID | {1,2,3...} |
| 6 | BROWSING OF ADVERTISEMENT A | {YES, NO} |
| 7 | BROWSING OF ADVERTISEMENT B | {YES, NO} |

PER-CLUSTER ATTRIBUTE INFORMATION TABLE 28

| CLUSTER ID | DOMINANT ATTRIBUTE |
|---|---|
| CLUSTER k = 1 | AGE: 20'S |
| | GENDER: FEMALE |
| | TRANSIT POINT: 3 (C STORE) |
| | BROWSING OF ADVERTISEMENT A: YES |
| CLUSTER k = 2 | AGE: 20'S |
| | GENDER: FEMALE |
| | BROWSING OF ADVERTISEMENT A: NO |
| ... | ... |

DISTRIBUTION CANDIDATE INFORMATION TABLE

| DISTRIBUTION INFORMATION ID | AGE | GENDER | WORKPLACE ID | TRANSIT POINT ID | DISTRIBUTED INFORMATION CONTENT | EVENT IMPLEMENTATION COST | COST EFFECTIVENESS SCORE |
|---|---|---|---|---|---|---|---|
| 1 | TEENAGERS | FEMALE | 1 | 1 | DISCOUNT COUPON INFORMATION OF STORE HANDLING COSMETIC PRODUCTS NEAR A STATION | 10 | 100 |
| 2 | 20'S | FEMALE | IRRELEVANT | 3 | DISCOUNT COUPON INFORMATION OF LADIES FASHION STORE NEAR C STORE | 10 | 20 |
| 3 | 20'S | MALE | 2 | 2 | ADVERTISEMENT OF JAPANESE-STYLE BAR IN B CITY | 10 | 5 |
| 4 | 50'S | FEMALE | 3 | 1 | DISCOUNT INFORMATION OF SUPERMARKET NEAR A STATION | 10 | 10 |
| 5 | 50'S | MALE | 2 | 2 | ADVERTISEMENT OF GOLF PRODUCTS IN B CITY | 1 | 0 |
| ... | ... | ... | ... | ... | ... | ... | ... |

FIG.9

INFORMATION DISTRIBUTION EVENT SCORE INFORMATION TABLE 30

| CLUSTER ID (BEFORE IMPLEMENTATION OF INFORMATION DISTRIBUTION) | COINCIDENT CLUSTER | INTER-CLUSTER CENTROID DISTANCE | EVENT IMPLEMENTATION COST | COST EFFECTIVENESS SCORE |
|---|---|---|---|---|
| 1 | YES | 0 | 10 | 0 |
| 2 | YES | 300 | 10 | 30 |
| 3 | NO | - | 10 | 5 |
| 4 | YES | 200 | 1 | 200 |
| 5 | NO | - | 10 | 5 |
| ... | ... | ... | ... | ... |

30A 30B 30C 30D 30E

FIG.12
(A) 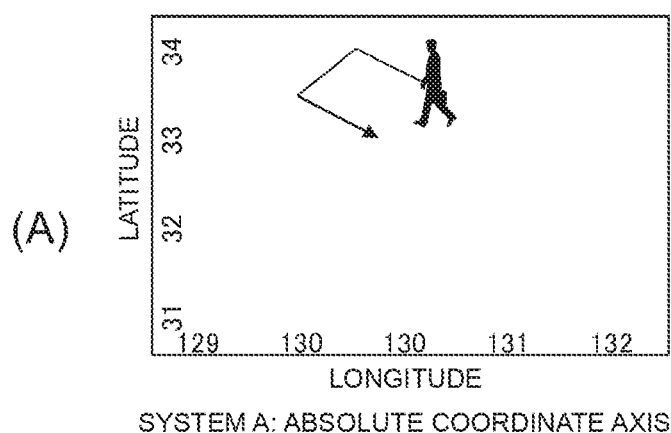
SYSTEM A: ABSOLUTE COORDINATE AXIS
(B) 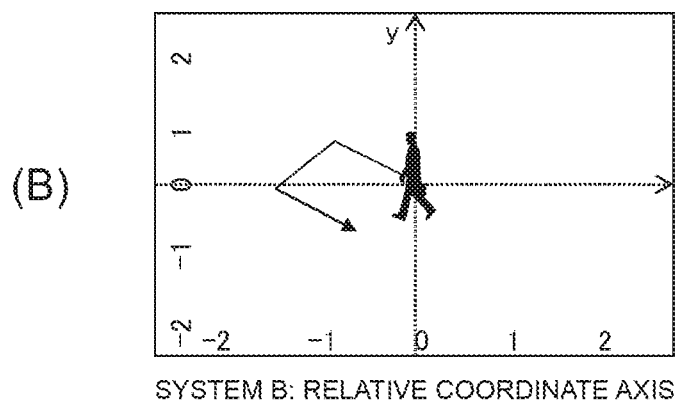
SYSTEM B: RELATIVE COORDINATE AXIS

FIG.13

|  | SYSTEM A | SYSTEM B |
|---|---|---|
| COORDINATE AXIS TO BE USED IN GENERATION OF FEATURE VALUE | ABSOLUTE COORDINATE AXIS | RELATIVE COORDINATE AXIS |
| FEATURE OF CLUSTERING | CLASSIFICATION TENDENCY BECOMES STRONGER BASED ON AREA AS REFERENCE POINT OF EXCURSION | CLASSIFICATION TENDENCY BECOMES STRONGER BASED ON MOVEMENT DIRECTION AND AMPLITUDE |
| ADVANTAGE | DISTRIBUTION AND BEHAVIOR OF PEOPLE ARE EASIER TO SEE FOR EACH AREA | MOVEMENT PATTERN OF PEOPLE IS EASIER TO SEE |
| DISADVANTAGE | MEMBERS WITH DIFFERENT MOVEMENT PATTERNS ARE CLASSIFIED INTO SAME CLUSTER | MEMBERS WITH DIFFERENT AREAS OF MOVEMENT ARE CLASSIFIED INTO SAME CLUSTER |
| KEY INDEX VALUE | CLASSIFICATION PERFORMANCE AT EXCURSION SPOTS | CLASSIFICATION PERFORMANCE OF EXCURSION PATTERN |

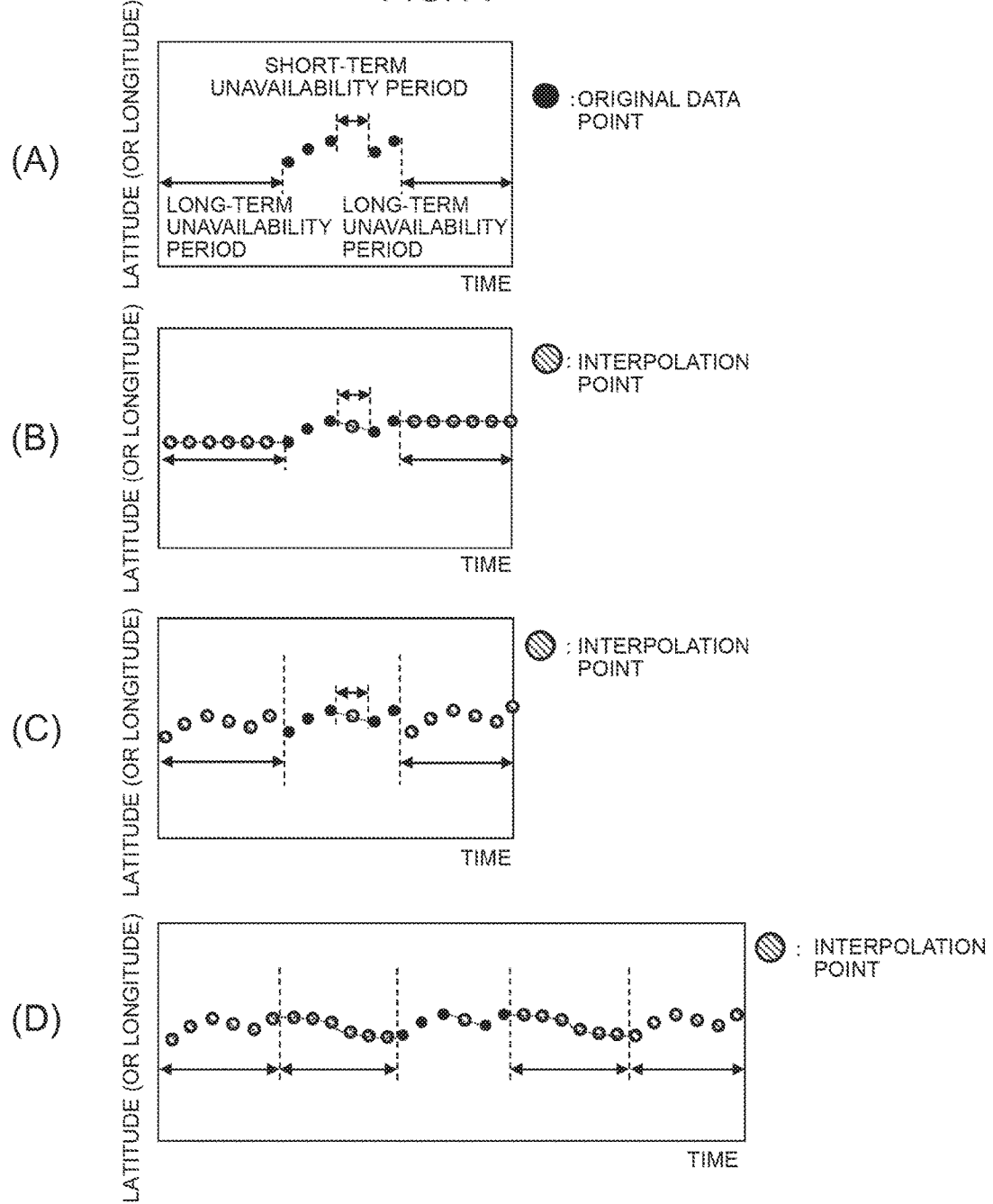

CLUSTER ATTRIBUTE DETERMINATION PROCESSING

INFORMATION DISTRIBUTION APPARATUS AND METHOD

TECHNICAL FIELD

The present invention relates to an information distribution apparatus and method, and, for example, can be suitably applied to an information distribution system which distributes, to mobile terminals such as smartphones and mobile phone terminals, information which is useful to their users.

BACKGROUND ART

In recent years, many mobile phones and other mobile terminals are equipped with a positioning function such as a GPS (Global Positioning System). A user of a mobile terminal is thereby able to acquire one's current position information based on the positioning result of the mobile terminal, and receive various types of service information according to the user's current position by sending the positioning result, via a network, to the information distribution apparatus of the telecommunications carrier or the service provider.

Note that, as a technology of acquiring the user's position information, known is the method disclosed in PTL 1. The user position acquisition method disclosed in PTL 1 acquires the latitude-longitude coordinate position of the mobile phone through triangulation based on the transmission of multiple signals to the mobile phone, signal strength of multiple signals, differences in incoming time of different signals, differences in incoming angles of different signals, GPS signals, and their combinations.

Meanwhile, in order to effectively distribute service information according to the user's current position, it is necessary to distribute proper service information, which coincides with the user's preference, at an appropriate timing. In order to realize the above, it would be desirable to estimate the area that the user may likely visit in the future based on that user's past position information, and then distribute service information in light of the status of service being provided in that area, and that user's attributes such as age and gender.

As technologies for estimating the area that the user may likely visit in the future and distributing service information according to that area, conventionally, the technology disclosed in PTL 2 and the technology disclosed in PTL 3 have been proposed.

Specifically, the user position estimation method disclosed in PTL 2 estimates the user's future position by extracting the user's transit pattern between short-stay destinations, creating a transit model between short-stay destinations in which the frequency of transit pattern is associated with the transit pattern between short-stay destinations, and searching for a portable terminable that is taking a moving route that is similar to the moving route of other portable terminals based on the longest matching partial series length between past short-term/long-term stay time series data, and short-term/long-term stay time series data of other portable terminals.

Furthermore, the service information distribution method disclosed in PTL 3 estimates the traveling route from the current location to the destination based on data of past traveling routes of a vehicle, and distributes to the information providing apparatus mounted on the vehicle, or presents to the passenger of the vehicle, advertisement data around the estimated traveling route.

CITATION LIST

Patent Literature

[PTL 1] Japanese Patent Application Publication No. 2002-199423
[PTL 2] Japanese Patent Application Publication No. 2015-49681
[PTL 3] Japanese Patent Application Publication No. 2004-69318

SUMMARY OF THE INVENTION

Problems to be Solved by the Invention

In the foregoing case, with the technologies disclosed in PTL 2 and PTL 3, since action is taken for each and every user, when distributing service information to a plurality of users, required are information processing resources (machine resource for estimating the route and calculating the distribution information, network resource for preventing the information, and terminal for preventing the information) in a quantity equivalent to the number of users to whom service information is to be distributed. Nevertheless, it may not be possible to sufficiently ensure the foregoing information processing resources at all times, and there is a problem in that the number of users to whom service information can be distributed is limited.

The present invention was devised in view of the foregoing points, and an object of this invention is to propose an information distribution apparatus and method capable of efficiently distributing information.

Means to Solve the Problems

In order to achieve the foregoing object, the present invention provides an information distribution apparatus which distributes information to a plurality of mobile communication objects, comprising a clustering processing unit which executes clustering processing of collecting time series position data, which is time series position information of each of the mobile communication objects, and classifying the time series position data into a plurality of clusters based on the collected time series position data of each of the mobile communication objects, a profiling processing unit which executes profiling processing of determining, for each of the clusters, a dominant attribute of each user in which the time series position data was allocated to the relevant cluster based on pre-registered attribute information of each of the users of each of the mobile communication objects, and an information distribution event determination/execution unit which determines, for each of the clusters, information to be distributed to each of the users in which the time series position data was allocated to the relevant cluster based on a processing result of the profiling processing.

The present invention additionally provides an information distribution method to be executed in an information distribution apparatus which distributes information to a plurality of mobile communication objects, comprising a first step of executing clustering processing of collecting time series position data, which is time series position information of each of the mobile communication objects, and classifying the time series position data into a plurality of clusters based on the collected time series position data of each of the mobile communication objects, a second step of executing profiling processing of determining, for each of the clusters, a dominant attribute of each user in which the time series position data was allocated to the relevant cluster based on pre-registered attribute information of each of the users of each of the mobile communication objects, and a third step of determining, for each of the clusters, information to be distributed to each of the users in which the time series position data was allocated to the relevant cluster based on a processing result of the profiling processing.

According to the information distribution apparatus and the information distribution method of the present invention, information can be distributed in cluster units, and it is also possible to distribute, for each cluster, information which is optimal for the users belonging to that cluster among the information to be distributed.

Advantageous Effects of the Invention

According to the present invention, it is possible to realize an information distribution apparatus and method capable of efficiently distributing information.

BRIEF DESCRIPTION OF DRAWINGS

FIG. 3 is a conceptual diagram showing a configuration example of the user position information table.

FIG. 4 is a conceptual diagram showing a configuration example of the user classification information table.

FIG. 5(A) to FIG. 5(D) are conceptual diagrams showing a configuration example of the user attribute information database.

FIG. 6 is a conceptual diagram showing a configuration example of the candidate attribute table.

FIG. 7 is a conceptual diagram showing a configuration example of the per-cluster attribute information table.

FIG. 8 is a conceptual diagram showing a configuration example of the distribution candidate information table.

FIG. 9 is a conceptual diagram showing a configuration example of the information distribution event score information table.

FIG. 12(A) and FIG. 12(B) are conceptual diagrams explaining the absolute coordinate axis and the relative coordinate axis.

FIG. 13 is a conceptual diagram explaining the absolute coordinate axis and the relative coordinate axis.

FIG. 14(A) to FIG. 14(D) are conceptual diagrams explaining the data interpolation processing.

DESCRIPTION OF EMBODIMENTS

An embodiment of the present invention is now explained in detail with reference to the appended drawings.

Figure 1:
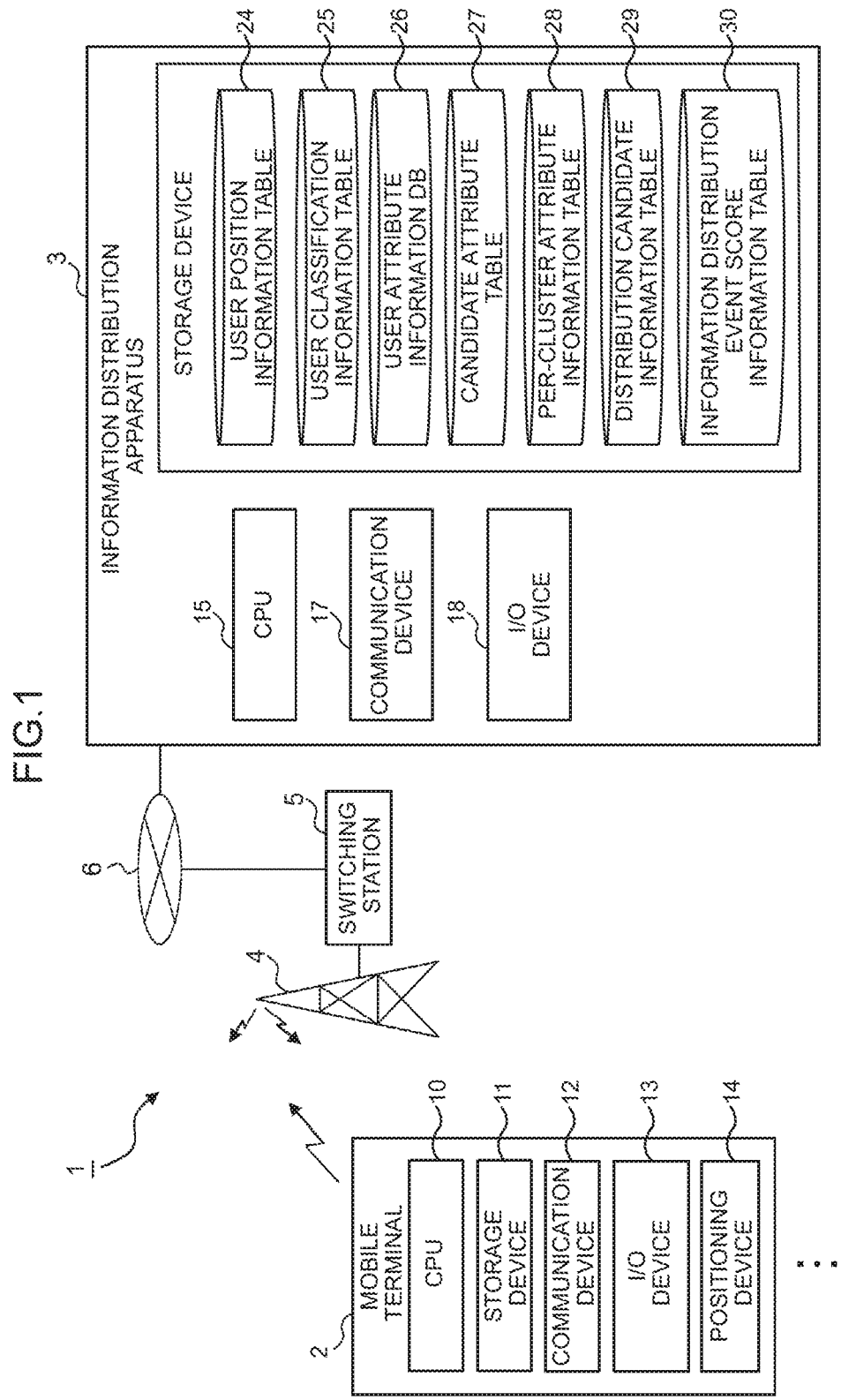
FIG. 1 is a block diagram showing the overall configuration of the information distribution system according to this embodiment.

(1) Configuration of Information Distribution System According to this Embodiment In FIG. 1, reference numeral 1 indicates the overall information distribution system according to this embodiment. The information distribution system 1 is configured by comprising one or more mobile terminals 2 and an information distribution apparatus 3, and these components are communicably connected, via a network 6, to a wireless communication network configured from a wireless base station 4 and a switching station 5.

The mobile terminal 2 is configured from a mobile communication terminal device such as a mobile phone equipped with a positioning function, and comprises a CPU (Central Processing Unit) 10, a storage device 11, a communication device 12, an I/O device 13 and a positioning device 14.

The CPU 10 is a processor that governs the operational control of the overall mobile terminal 2. Moreover, the storage device 11 is configured from a semiconductor memory or the like, and is used for storing and retaining various programs, and is also used as a work memory of the CPU 10. As a result of the CPU 10 executing the programs stored in the storage device 11, the various types of processing are executed as the overall mobile terminal 2 as described later. The communication device 12 has a function of performing wireless communication with the wireless base station 4 based on a communication system that is compliant with a prescribed wireless communication standard.

The I/O device 13 is configured from an input device (hardware) to be used by the user of the mobile terminal 2 (the user of the mobile terminal 2 is hereinafter simply referred to as the "user") for inputting various operations, and an output device (hardware) for outputting images and sounds. As the input device, used may be, for instance, buttons and arrow keys, or a touch panel, and as the output device, used may be, for instance, a liquid crystal panel or a speaker.

The positioning device 14 has a function of receiving signals sent from a plurality of GPS satellites, and measuring the current position of the mobile terminal 2 based on the received signals. The position data which represents the current position of the mobile terminal that was measured by the positioning device 14 (this shall hereinafter mean the current position of the user in possession of the mobile terminal 2) is accumulated in the storage device 11, and the accumulated time series position data is sent as the time series position data from the communication device 12 to the information distribution apparatus 3, via the wireless communication network and the network 6, in response to a request from the information distribution apparatus 3.

The wireless base station 4 is a mobile phone network terminal that directly interacts with the mobile terminal 2, and transforms the wireless signal sent from the mobile terminal 2 into a signal that is compliant with the communication standard of the mobile phone network and outputs the transformed signal to the switching station 5, or transforms the signal sent from the switching station 5 into a wireless signal that is compliant with the foregoing wireless communication standard, and sends the transformed wireless signal to the destination mobile terminal 2.

The switching station 5 is a facility that configures a part of the mobile phone network, and transforms the signal sent from the wireless base station 4 into a signal of a system that is compliant with the communication standard of the network 6 and outputs the transformed signal to the information distribution apparatus 3 via the network 6, or transforms the signal sent from the information distribution apparatus 3 via the network 6 into a signal that is compliant with the communication standard of the wireless communication network, and outputs the transformed signal to the wireless base station 4.

The network 6 is configured, for example, from a LAN (Local Area Network), the internet, a public line or a dedicated line. Communication between the switching station 5 and the information distribution apparatus 3 via the network 6 is performed, for instance, according to the TCP/IP (Transmission Control Protocol/Internet Protocol) when the network 6 is a LAN or the internet.

The information distribution apparatus 3 is a server apparatus which distributes the user's current position or optimal service information according to the user's preference based on the time series position data collected from the respective mobile terminals 2, and is configured by comprising a CPU 15, a storage device 16, a communication device 17 and an I/O device 18.

The CPU 15 is a processor that governs the operational control of the overall information distribution apparatus 3. Moreover, the storage device 16 is configured from a semiconductor memory or a hard disk device, and is used for retaining various programs and various data. As a result of the CPU 15 executing the programs stored in the storage device 16, the various types of processing are executed as the overall information distribution apparatus 3 as described later.

The communication device 17 is an interface for performing protocol control when the information distribution apparatus 3 communicates with the switching station 5 via the network 6, and is configured from an NIC (Network Interface Card) or the like.

The I/O device 18 is configured from an input device and an output device. The input device is hardware to be used by the user for inputting various operations, and, used may be, for instance, buttons and arrow keys, or a touch panel. The output device is hardware for outputting images and sounds, used may be, for instance, a liquid crystal panel or a speaker.

(2) Information Distribution and Distribution Effect Evaluation Function According to this Embodiment The information distribution and distribution effect evaluation function according to this embodiment equipped in the information distribution apparatus 3 is now explained. The information distribution and distribution effect evaluation function is a function of classifying the mobile information (time series position data) of a plurality of users into a plurality of clusters based on the clustering processing, determining a dominant user attribute for each of the classified clusters based on the profiling processing, generating an information distribution event, for each cluster, of a user in which the time series position data affiliated with that cluster (this user is hereinafter referred to as the "cluster-affiliated user" as appropriate) based on the determined attribute for each cluster, and evaluating the effect of the information distribution event based on the implementation result of the information distribution event.

Figure 2:
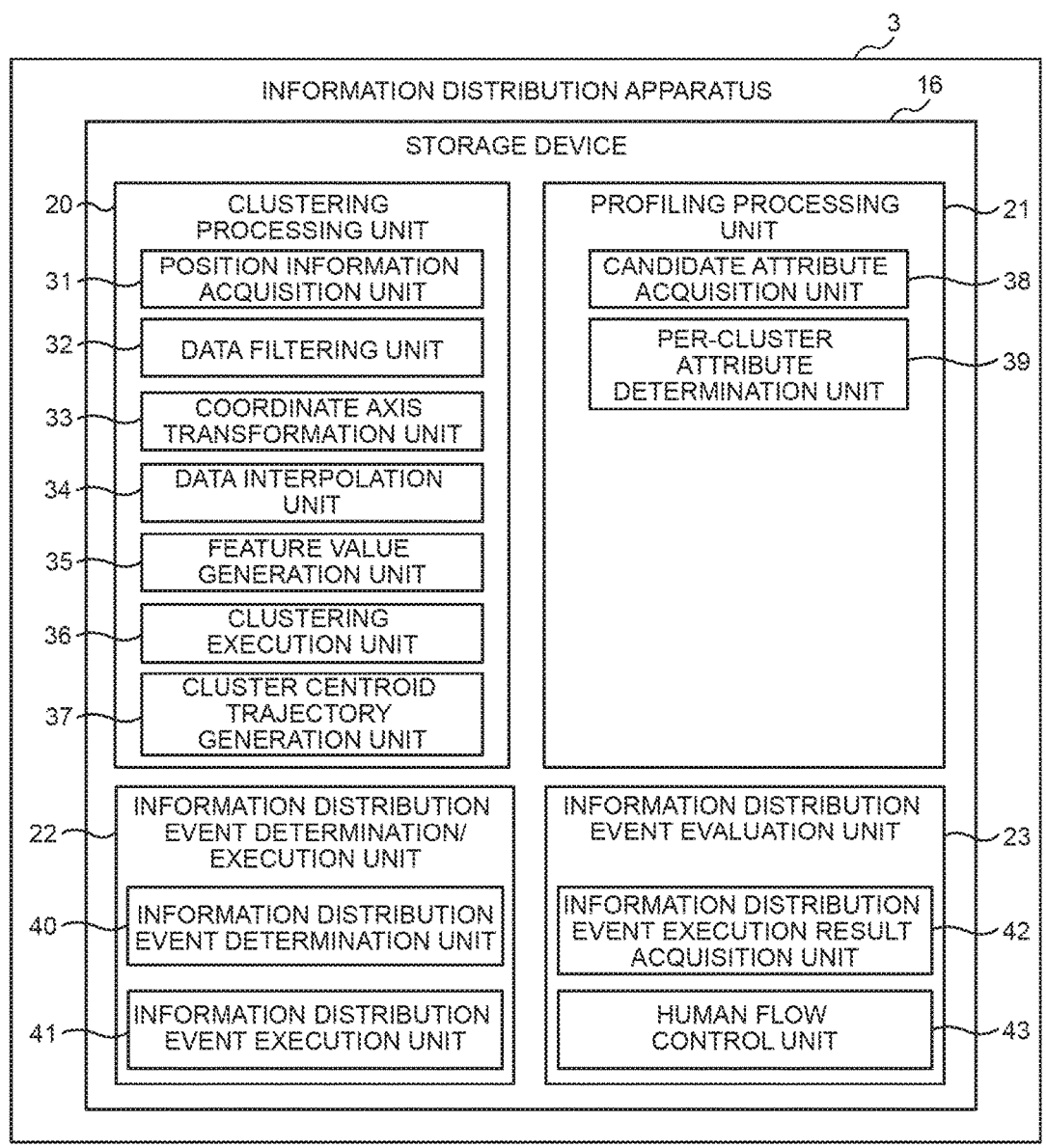
FIG. 2 is a block diagram showing the program configuration of the information distribution apparatus.

As means for realizing the foregoing information distribution and distribution effect evaluation function, the storage device 16 of the information distribution apparatus 3 stores as programs, as shown in FIG. 2, a clustering processing unit 20, a profiling processing unit 21, an information distribution event determination/execution unit 22, an information distribution event evaluation unit 23 and a human flow control unit 43, and stores as tables and databases required for managing necessary information, as shown in FIG. 1, a user position information table 24, a user classification information table 25, a user attribute information database 26, a candidate attribute table 27, a per-cluster attribute information table 28, a distribution candidate information table 29 and an information distribution event score information table 30.

The clustering processing unit 20 is a program with a function of classifying the mobile information (time series position data) of a plurality of users based on the clustering processing, and is configured from, as shown in FIG. 2, a position information acquisition unit 31, a data filtering unit 32, a coordinate axis transformation unit 33, a data interpolation unit 34, a feature value generation unit 35, a clustering execution unit 36 and a cluster centroid trajectory generation unit 37.

The position information acquisition unit 31 is a module with a function of collecting, as the mobile information of each user, the time series position data of the position information (latitude and longitude) measured by the positioning device 14 (FIG. 1) of the respective mobile terminals 2. The position information acquisition unit 31 collects the time series position data retained in the mobile terminals 2 by sending a transfer request of the time series position data to the respective mobile terminals 2 periodically or randomly, and manages the collected time series position data by registering such time series position data in the user position information table 24. However, the configuration may also be such that the respective mobile terminals 2 send the time series position data to the information distribution apparatus 3 periodically or randomly, and the position information acquisition unit 31 manages the time series position data by registering such time series position data in the user position information table 24.

The data filtering unit 32 is a module with a filtering function of identifying the area in which the movement of pre-designated persons is to be analyzed (this area is hereinafter referred to as the "analyzing area") based on latitude and longitude, and extracting only the time series position data of users who previously passed through the analyzing area among the time series position data of the respective users accumulated in the user position information table 24 as described above.

The coordinate axis transformation unit 33 is a module with a function of transforming the coordinate axis of the respective time series position data extracted by the data filtering unit 32 into a relative coordinate axis as needed. In the case of this embodiment, the information distribution apparatus 3 selects either an absolute coordinate axis or a relative coordinate axis as the coordinate axis to be used in the subsequent analysis according to the purpose of classification. The absolute coordinate axis and the relative coordinate axis will be described in detail later.

The data interpolation unit 34 is a module with a function of executing data interpolation processing, for interpolating missing values, to the respective time series data which were extracted by the data filtering unit 32 and subsequently transformed into a coordinate axis by the coordinate axis transformation unit 33 as needed. Moreover, the feature value generation unit 35 is a module with a function of generating a feature value of the respective time series position data based on the respective time series position data that were subject to data interpolation.

The clustering execution unit 36 is a module with a function of executing the clustering processing of classifying the time series position data (each user) into a plurality of clusters based on the feature value of the respective time series position data generated by the feature value generation unit 35. The clustering execution unit 36 manages the processing result of the clustering processing by registering such processing result in the user classification information table 25.

The cluster centroid trajectory generation unit 37 is a module with a function of generating a trajectory of a cluster centroid for each cluster of the time series position data generated by the clustering execution unit 36. The trajectory of the cluster centroid of each cluster generated by the cluster centroid trajectory generation unit 37 is displayed on the I/O device 18 (FIG. 1) as needed.

Meanwhile, the profiling processing unit 21 is a program with a function of executing the profiling processing of estimating and determining a dominant attribute of each user affiliated with a cluster for each cluster of the time series position data generated by the clustering processing unit 20, and is configured from, as shown in FIG. 2, a candidate attribute acquisition unit 38 and a per-cluster attribute determination unit 39.

The candidate attribute acquisition unit 38 is a module with a function of acquiring items that may become the attributes of the cluster in the profiling processing as well as the attributes (values) thereof. The candidate attribute acquisition unit 38 acquires the foregoing items and attributes from the candidate attribute table 27 (FIG. 6) described later.

Moreover, the per-cluster attribute determination unit 39 is a module with a function of selecting and determining a dominant attribute of a cluster for each cluster. The per-cluster attribute determination unit 39 manages the dominant attribute determined for each cluster by registering such dominant attribute in the per-cluster attribute information table 28.

Meanwhile, the information distribution event determination/execution unit 22 is a program with a function of determining the information to be distributed to each of the cluster-affiliated users and distributing the determined information to such users based on the processing result of the foregoing profiling processing executed by the profiling processing unit 21. The information distribution event determination/execution unit 22 is configured from, as shown in FIG. 2, an information distribution event determination unit 40 and an information distribution event execution unit 41.

The information distribution event determination unit 40 is a module with a function of determining, for each cluster, the information to be distributed to the respective cluster-affiliated users based on the distribution candidate information table 29 in which information to be distributed to users with specific attributes is registered in advance, and the foregoing per-cluster attribute information table 28. Moreover, the information distribution event execution unit 41 is a module with a function of executing an information distribution event of distributing information to the respective users according to the determination result of the information distribution event determination unit 40.

The information distribution event evaluation unit 23 is a program with a function of evaluating the effect of the information distribution event that was executed by the information distribution event determination/execution unit 22, and is configured from, as shown in FIG. 2, an information distribution event execution result acquisition unit 42.

The information distribution event execution result acquisition unit 42 is a module with a function of comparing the classification pattern of the time series position data before and after the execution of the information distribution event, and evaluating the effect of the information distribution event based on the comparative result. Specifically, the information distribution event execution result acquisition unit 42 calculates the cost effectiveness of the information distribution event as a score, and manages the calculated score (this score is hereinafter referred to as the "cost effectiveness score") as the evaluation of the information distribution event by registering such score in the distribution candidate information table 29 and the information distribution event score information table 30.

The human flow control unit 43 is an application program with a function of estimating the number of visitors to a store or the number of pedestrians on a street per hour based on the processing result of the clustering processing executed by the clustering processing unit 20 and the processing result of the profiling processing executed by the profiling processing unit 21, and controlling the number of visitors to a store or the number of pedestrians on a street by causing the information distribution event determination/execution unit 22 to distribute information as needed based on the estimation result. The specific processing contents of the human flow control unit 43 will be described later.

Meanwhile, the user position information table 24 is a table that is used for retaining the time series position data collected from the respective mobile terminals 2 by the position information acquisition unit 31 of the clustering processing unit 20 (FIG. 1), and is configured by comprising, as shown in FIG. 3, a user ID column 24A, an item column 24B and a value column 24C.

The user ID column 24A stores the identifier (user ID) unique to each user which was assigned to the users of the respective mobile terminals 2 from which the time series position data was collected by the information distribution apparatus 3.

Moreover, the item column 24B is divided into a time stamp column 24D and a position information column 24E, and the position information column 24E is further divided into a latitude column 24F, a longitude column 24G and a position measurement error column 24H, and the value column 24C stores the value of the corresponding item.

Specifically, the value column 24C corresponding to the time stamp column 24D stores a list which arranges, in chronological order, the respective position data configuring the time series position data of the corresponding user from the oldest time that the position data was acquired by the positioning device 14 (FIG. 1) of the mobile terminal 2, and the value column 24C corresponding respectively to the latitude column 24F and the longitude column 24G stores a list which arranges, in chronological order, the values of either the latitude or the longitude where the position data was acquired by the positioning device 14 from the oldest value. Furthermore, the value column 24C corresponding to the position measurement error column 24H stores a list which arranges, in chronological order, in cases where a position measurement error of the positioning device 14 is recognized at each point in time, the position measurement errors from the from the oldest position measurement error.

Accordingly, in the case of the example shown in FIG. 3, with regard to the user having a user ID of "1", position data measured at "2015-01-01 09:00", "2015-01-01 09:05", . . . was collected as the time series position data, the positioning results at "2015-01-01 09:00" were a latitude of "35.451414", a longitude of "139.632177", and a position measurement error of "10.0 m", and the positioning results at "2015-01-01 09:05" were a latitude of "35.451416", a longitude of "139.635137", and a position measurement error of "10.0 m".

The user classification information table 25 is a table that is used for managing the processing result of the clustering processing executed by the clustering processing unit 20 (FIG. 2), and is configured by comprising, as shown in FIG. 4, a cluster ID column 25A, an item column 25B and a value column 25C.

The class ID column 25A stores the identifier (cluster ID) unique to each cluster which was assigned to the respective clusters generated in the clustering processing.

Moreover, the item column 25B is divided into a sample user count column 25D, a sample user ID list column 25E and a cluster centroid column 25F, and the cluster centroid column 25F is further divided into a latitude column 25G and a longitude column 25H, and the value column 25C stores the value of the corresponding item.

Specifically, the value column 25C corresponding to the sample user count column 25D stores the number of users affiliated with the corresponding cluster, and the value column 25C corresponding to the sample user ID list column 25E stores a list which enumerates the user ID of the users. Moreover, the value column 25C corresponding to the latitude column 25G of the cluster centroid column 25F stores a list of latitudes of the centroid position of the cluster (this is hereinafter referred to as the "cluster centroid position") calculated based on the position data that was calculated at the same time of the respective users affiliated with the corresponding cluster, and the value column 25C corresponding to the longitude column 25H of the cluster centroid column 25F stores a list of longitudes of the cluster centroid position.

Accordingly, in the case of the example shown in FIG. 4, with regard to the cluster having a cluster ID of "1", the number of cluster-affiliated users is "4000", the user ID of the users is "1, 2, 5, . . . 6400", the latitude and longitude of the cluster centroid at each point in time were, in order, "35.451414, 139.632177", "35.451416, 139.635137", . . . .

The user attribute information database 26 is a database that is used for managing the pre-registered attribute information of the respective users, and is configured by comprising, as shown in FIG. 5(A) to FIG. 5(D), a user attribute information table 26A, a home ID table 26B, a workplace ID table 26C and a transit point ID table 26D.

The user attribute information table 26A is a table for managing the attribute information of the respective users, and is configured from, as shown in FIG. 5(A), a user ID column 26AA, an attribute information column 26AB and a value column 26AC. The user ID column 26AA stores the user ID of each user for which attribute information has been registered, and the attribute information column 26AB stores the attribute name of several attributes. Moreover, the value column 26AC stores the value of the corresponding attribute of the corresponding user.

Furthermore, the home ID table 26B is a table for managing the correspondence of the home ID and the municipality, and is configured from, as shown in FIG. 5(B), a home ID column 26BA and a value column 26BB. The home ID column 26BA stores the identifier (home ID) that is assigned to the location of the user's home, and the value column 26BB stores the address (for instance, in units of municipality) associated with the corresponding home ID.

Furthermore, the workplace ID table 26C is a table for managing the correspondence of the workplace ID and the municipality, and is configured from, as shown in FIG. 5(C), a workplace ID column 26CA and a value column 26CB. The workplace ID column 26CA stores the identifier (workplace ID) that is assigned to the location of the user's workplace, and the value column 26CB stores the address (for instance, in units of municipality) associated with the corresponding workplace ID.

The transit point ID table 26D is a table for managing the correspondence of the transit point ID and the transit point, and is configured from, as shown in FIG. 5(D), a transit point ID column 26DA and a value column 26DB. The transit point ID column 26DA stores the identifier (transit point ID) that was assigned to the station, store or other landmarks as potential transit points during the user's movements, and the value column 26DB stores the landmark name associated with the corresponding transit point ID.

Accordingly, in the case of the example shown in FIG. 5(A) to FIG. 5(D), the information distribution apparatus 3 is managing, as the attributes of the respective users, "age", "gender", "home ID", "workplace ID", "transit point ID", "browsing of advertisement A" and "browsing of advertisement B", and, for example, with regard to the user having a user ID of 1", that user's age is "20's", gender is "female", home is "B city", workplace is "C city", current transit point is "A station", history of browsing advertisement A is "Yes", and history of browsing advertisement B is "No".

The candidate attribute table 27 is a table that is used for storing and retaining items that may become the attributes of the cluster as well as the attributes (values) thereof which are referred to in the foregoing profiling processing, and, for instance, is created in advance by the operator or the like. The candidate attribute table 27 is configured from, as shown in FIG. 6, an attribute ID column 27A, an item column 27B and an attribute column 27C.

The item column 27B stores the respective items of the pre-set attributes, and the attribute ID column 27A stores the identifier (attribute ID) that is assigned to the corresponding item. Moreover, the attribute column 27C stores the value that may become the user's attribute regarding the corresponding item.

Accordingly, in the case of the example shown in FIG. 6, as the attribute items, there are the 7 items of "age", "gender", "home ID", "workplace ID", "transit point ID", "browsing of advertisement A" and "browsing of advertisement B" in which "1" to "7" are respectively assigned as the attribute ID, and, among the above, for instance, for the time of "age", there are the attributes of "pre-teen", "teenagers", "20's", . . . "90's or older", and for the time of "gender", there are the attributes of "male" and "female".

The per-cluster attribute information table 28 is a table that is used for managing the processing result of the profiling processing executed by the profiling processing unit 21 (FIG. 2), and is configured from, as shown in FIG. 7, a cluster ID column 28A and a dominant attribute column 28B.

The cluster ID column 28A stores the cluster ID of the respective clusters, and the dominant attribute column 28B stores the dominant attribute of the respective items described above with reference to FIG. 5(A) in relation to the corresponding cluster-affiliated user determined based on the profiling processing.

Accordingly, in the case of the example shown in FIG. 7, with regard to the cluster having a cluster ID of "1", the dominant attributes are as follows; specifically, age is "20's", gender is "female", transit point is "C store", and browsing history of advertisement A is "Yes".

The distribution candidate information table 29 is a table that is used for managing information as the distribution candidate (this information is hereinafter referred to as the "distribution candidate information") to be distributed to users who satisfy predetermined attributes, and is configured by comprising, as shown in FIG. 8, a distribution information ID column 29A, an attribute item column 29B, a distribution information content column 29C, an event implementation cost column 29D and a cost effectiveness score column 29E.

The distribution information ID column 29A stores the identifier (distribution information ID) unique to the distribution candidate information which is assigned to each distribution candidate information. Moreover, the attribute item column 29B is divided into a plurality of item columns (in the case of FIG. 8, respective item columns of "age", "gender", "workplace ID" and "transit point ID") 29BA to 29BD in correspondence with a plurality of attribute items, and the item columns 29BA to 29BD respectively store the value (attribute) of each attribute item of the user to which the corresponding distribution candidate information is to be distributed.

Furthermore, the distribution information content column 29C stores the specific contents of the corresponding distribution candidate information, and the event implementation cost column 29D stores the cost that will be incurred for implementing the event (distribution of discount coupons, discount of store products) in the corresponding distribution information. This cost is calculated, for example, for the event of "distribution of discount coupons", based on the amount of discount offered by the coupons, or the number of coupons that are issued.

Furthermore, the cost effectiveness score column 29E stores the foregoing cost effectiveness score calculated by the information distribution event execution result acquisition unit 42. The method of calculating the cost effectiveness score will be described later.

Accordingly, in the case of the example shown in FIG. 8, the distribution candidate information having a distribution information ID of "1" prescribes that "discount coupon information of a store that sells cosmetic products around A station" should be distributed to "teenage" "females" having a workplace ID of "1" and a transit point ID of "1", the event implementation cost thereof is "10", and the cost effectiveness score of the distribution event of the distribution candidate information implemented previously was "100".

The information distribution event score information table 30 is a table that is used for managing the evaluation result of the information distribution event evaluation unit 23 of the event of distributing information (this event is hereinafter referred to as the "information distribution event"), and is configured by comprising, as shown in FIG. 9, a cluster ID column 30A, a coincident cluster column 30B, an inter-cluster centroid distance column 30C, an event implementation cost column 30D and a cost effectiveness score column 30E.

The cluster ID column 30A stores the cluster ID of the respective clusters generated based on the clustering processing of the time series position data of the respective users executed before the implementation of the information distribution event (this cluster is hereinafter referred to as the "pre-information distribution event cluster" as appropriate), and the coincident cluster column 30B stores information representing whether, among the respective clusters generated based on the clustering processing of the time series position data of the respective users executed after the information distribution event as described later, a post-information distribution event cluster having the same attribute (or in which the number of coinciding attributes is equal to or greater than a threshold) exists in the pre-information distribution event cluster of the corresponding cluster ID ("Yes" if such post-information distribution event cluster exists, and "No" if such post-information distribution event cluster does not exist).

Moreover, in cases where a post-information distribution event cluster having the same attribute (or in which the number of coinciding attributes is equal to or greater than a threshold) exists in the corresponding pre-information distribution event cluster, the inter-cluster centroid distance column 30C stores the distance between the cluster centroids between the pre-information distribution event cluster and the post-information distribution event cluster. Note that if a post-information distribution event cluster does not exist in the corresponding pre-information distribution event cluster, the inter-cluster centroid distance column 30C stores ("-") as information indicating that data does not exist.

Furthermore, the event implementation cost column 30D stores the event implementation cost described above with reference to FIG. 8, and the cost effectiveness score column 30E stores the cost effectiveness score described above with reference to FIG. 8.

(3) Various Types of Processing Related to Information Distribution and Distribution Effect Evaluation Function The processing contents of the various types of processing to be executed by the information distribution apparatus 3 in relation to the information distribution and distribution effect evaluation function according to this embodiment are now explained. In the ensuing explanation, while the processing subject of the various types of processing is explained as a program or a module, in effect, it goes without saying that the processing is executed by the CPU 15 (FIG. 1) based on the program or module.

Figure 10:
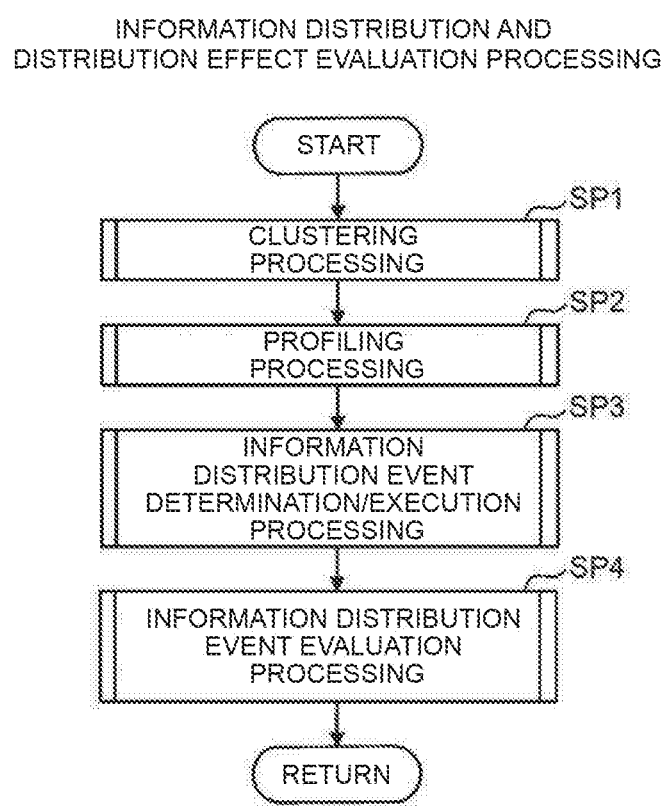
FIG. 10 is a flowchart showing the processing routine of the information distribution and distribution effect evaluation processing.

(3-1) Processing Flow of Information Distribution and Distribution Effect Evaluation Function FIG. 10 shows the flow of the series of processing related to the information distribution and distribution effect evaluation function according to this embodiment (this processing is hereinafter referred to as the "information distribution and distribution effect evaluation processing"). The information distribution and distribution effect evaluation processing is started when the operator operates the information distribution apparatus 3 and sets the foregoing analyzing area, the coordinate axis (absolute coordinate axis or relative coordinate axis) and the data interpolation method to be used during the clustering processing described later, and thereafter performs prescribed operations to the effect of executing the information distribution and distribution effect evaluation processing.

When the information distribution and distribution effect evaluation processing is started, the clustering processing unit 20 (FIG. 2) foremost executes the clustering processing of collecting the time series position data from the respective mobile terminals 2, and classifying the collected time series position data of the respective mobile terminals 2 into a plurality of clusters (SP1). When the clustering processing is completed, the clustering processing unit 20 activates the profiling processing unit 21 (FIG. 2).

When the profiling processing unit 21 is activated by the clustering processing unit 20, the profiling processing unit 21 executes the profiling processing of determining the dominant attributes of users allocated to the cluster regarding the respective clusters of the time series position data generated by the clustering processing unit 20 (SP2). The profiling processing unit 21 thereafter activates the information distribution event determination/execution unit 22 (FIG. 2).

When the information distribution event determination/execution unit 22 (FIG. 2) is activated by the profiling processing unit 21, the information distribution event determination/execution unit 22 determines, for each cluster, the distribution candidate information to be distributed to the cluster-affiliated user based on the processing result of the foregoing profiling processing executed by the profiling processing unit 21, and distributes the determined distribution candidate information to the users (SP3). After the lapse of a given time thereafter, the information distribution event determination/execution unit 22 activates the information distribution event evaluation unit 23 (FIG. 2).

When the information distribution event evaluation unit 23 is called by the information distribution event determination/execution unit 22, the information distribution event evaluation unit 23 executes the information distribution event evaluation processing of evaluating the effect of the corresponding information distribution event of each cluster executed by the information distribution event determination/execution unit 22, and displays the processing result of the information distribution event evaluation processing on the I/O device 18 (FIG. 1) in a prescribed format (SP4).

When the information distribution apparatus 3 finishes displaying the processing result of the information distribution event evaluation processing, the information distribution apparatus 3 ends the series of information distribution and distribution effect evaluation processing.

(3-2) Clustering Processing

Figure 11:
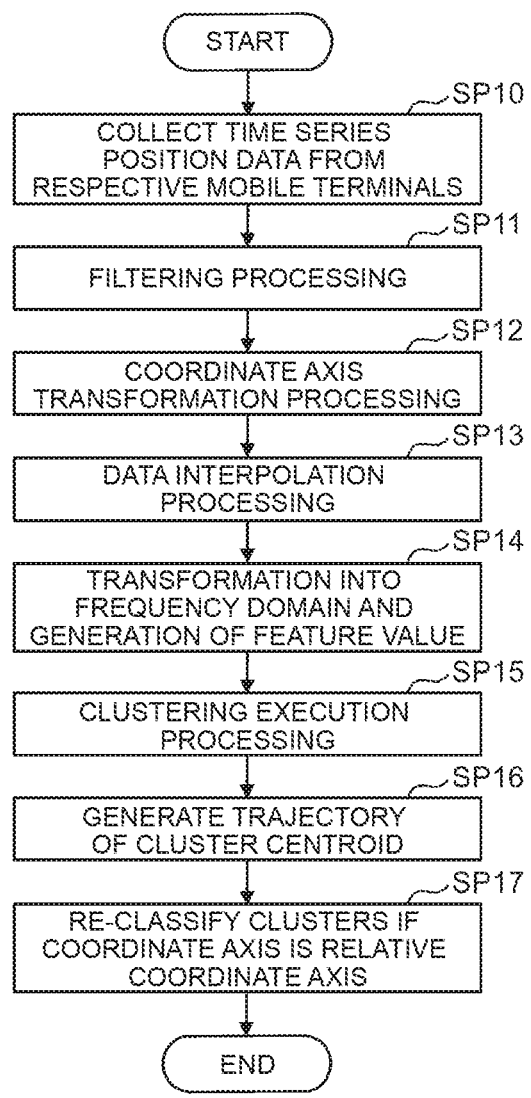
FIG. 11 is a flowchart showing the processing routine of the clustering processing.

FIG. 11 shows the specific processing flow of the clustering processing to be executed by the clustering processing unit 20 in step SP1 of FIG. 10.

In the clustering processing, the position information acquisition unit 31 (FIG. 2) foremost collects, from the respective mobile terminals 2, the time series position data retained in such mobile terminals 2, and registers the collected time series position data in the user position information table 24 (FIG. 3) (SP10). The position information acquisition unit 31 thereafter calls the data filtering unit 32 (FIG. 2).

When the data filtering unit 32 is called by the position information acquisition unit 31, the data filtering unit 32 executes the filtering processing of extracting only the time series position data of users who previously passed through the analyzing area among the time series position data of the respective users accumulated in the user position information table 24 based on the set range information (latitude and longitude) of the analyzing area (SP11).

Here, even if a user has previously passed through the analyzing area, if the number of position data configuring the time series position data of that user falls below a predetermined threshold, the data filtering unit 32 deletes the time series position data of that user. Moreover, the data filtering unit 32 also deletes, at this stage, the position data having a major measurement error registered in the user position information table 24. The data filtering unit 32 thereafter calls the coordinate axis transformation unit 33 (FIG. 2).

When the coordinate axis transformation unit 33 is called by the data filtering unit 32, the coordinate axis transformation unit 33 executes the coordinate axis transformation processing of transforming the coordinate axis as needed to the time series position data after the foregoing filtering processing executed by the data filtering unit 32 (SP12).

In the case of the information distribution apparatus 3, the operator may select in advance with an absolute coordinate axis or a relative coordinate axis as the coordinate axis to be used in the subsequent analysis according the purpose of classification of the time series position data. The absolute coordinate axis is a coordinate axis, as shown in FIG. 12(A), in which the user's latitude and longitude collected as described above are used as the user's position without change, and the relative coordinate axis is a coordinate axis, as shown in FIG. 12(B), which indicates the user's position based on the default value of the position information configuring that user's time series position data.

As shown in FIG. 13, while the system (system A) adopting the absolute coordinate axis is advantageous in that the distribution and behavior of people are easier to see for each area, there is a disadvantage in that there are cases where users with a different movement pattern are classified in the same cluster. Meanwhile, while the system (system B) adopting the absolute coordinate axis is advantageous in that the movement pattern of users is easier to see, there is a disadvantage in that there are cases where users moving through different areas are classified in the same cluster. However, the disadvantage of the system B can be basically resolved by re-classifying the classification result based on the area, and extracting a representative movement pattern for each area.

Thus, when the absolute coordinate axis has been selected as the coordinate axis by the operate in advance in step SP12, the coordinate axis transformation unit 33 does not take any action, and, when the relative coordinate axis has been selected as the coordinate axis, the coordinate axis transformation unit 33 executes the coordinate axis transformation processing of transforming the coordinate axis into the relative coordinate axis to the respective time series position data after being subject to the filtering processing in step SP11. The coordinate axis transformation unit 33 thereafter calls the data interpolation unit 34 (FIG. 2).

When the data interpolation unit 34 is called by the coordinate axis transformation unit 33, the data interpolation unit 34 executes the data interpolation processing of interpolating missing values to the respective time series position data that were subject to the coordinate axis transformation processing as needed in step SP12 (SP13).

This is because, while the number of feature values needs to be equal for each user in order to execute the clustering processing, the time series position data basically has a short-term data unavailability period and a long-term data unavailability period as shown in FIG. 14(A). As the data interpolation method to be used in the foregoing case, the following first to third data interpolation methods may be adopted.

The first data interpolation method is a method where, as shown in FIG. 14(B), the short-term data unavailability period is interpolated based on the linear interpolation method, and the long-term data unavailability period is interpolated based on the value of the time series position data that is immediately after or immediately before the data unavailability period. Moreover, the second data interpolation method is a method where, as shown in FIG. 14(C), the short-term data unavailability period is interpolated based on the linear interpolation method, and the long-term data unavailability period is interpolated by performing repetitive interpolation to the existing short-term time series position data.

Furthermore, the third data interpolation method is a method where, as shown in FIG. 14(D), the short-term data unavailability period is interpolated based on the linear interpolation method, and the long-term data unavailability period is interpolated by concurrently performing repetitive interpolation of the existing short-term time series position data, and performing curve interpolation. The curve interpolation, for instance, by adopting a smooth curve interpolation method such as spline interpolation, and reduce noise during the Fourier transformation described later. According to the third data interpolation method, periodical features can be acquired more easily based on the repetitive interpolation of short-term data while maintaining information regarding the start time of movement based on the curve interpolation.

The data interpolation unit 34 executes the data interpolation processing by using one among the first to third data interpolation methods described above, and calls the feature value generation unit 35 (FIG. 2) when the data interpolation processing is completed.

When the feature value generation unit 35 is called by the data interpolation unit 34, the feature value generation unit 35 executes the feature value generation processing of generating the feature value of the respective time series position data that were subject to the data interpolation processing (SP14).

Here, in order to analyze the features including position and mobile speed, the feature value generation unit 35 generates the feature value of each time series position data upon transforming the respective time series position data that were subject to the data interpolation processing into a frequency domain based on Fourier transformation.

Specifically, the feature value generation unit 35 foremost transforms, with regard to each of the target time series position data, the respective position information (latitude and longitude) configuring the time series position data into complex number data in which the latitude data is a real part and the longitude data is an imaginary part. Moreover, the feature value generation unit 35 transforms the complex number data (time series position data) into frequency data based on Fourier transformation. Furthermore, the feature value generation unit 35 generates, for each time series position data, a feature value vector by performing linear combination to the real part and the imaginary part of the respective position information that were transformed into frequency data in the manner described above, and uses the generated feature value vector as the feature value of the time series position data.

The feature value generation unit 35 calls the clustering execution unit 36 (FIG. 2) after generating the feature value of the respective time series position data in the manner described above.

When the clustering execution unit 36 is called by the feature value generation unit 35, the clustering execution unit 36 executes the clustering execution processing of classifying the time series position data into a plurality of clusters (the clusters at this stage are hereinafter referred to as the "provisional clusters") through the k-means method or the like based on the feature values of each of the target time series position data (SP15).

Here, the clustering execution unit 36 performs the classification by sequentially setting the number of clusters to 2, 3, 4, . . . , and determines the optimal number of clusters by evaluating, on a case-by-case basis, the similarity in the provisional clusters and the separability between the provisional clusters.

The similarity in the provisional clusters is evaluated, for example, by evaluating the clustering result of each of the provisional clusters 1 to M based on the feature value of the time series position data of each user and the distance between the cluster centroids between the respective provisional clusters. As the method of using the feature value of the time series position data of each user and the distance between the cluster centroids between the respective provisional clusters, for instance, evaluation is performed by using the feature value of the respective time series position data in the provisional clusters and the distance between the cluster centroids between the respective provisional clusters, the variance of the respective time series data in the provisional clusters, and the number of clusters.

As this kind of method, for example, there is a method of performing the evaluation by using Akaike's Information Criterion (AIC). Akaike's Information Criterion is generally expressed with the following formula with the maximum likelihood as L, and the number of freedom parameters as K.

$$AIC = -2\ln L + 2K \qquad \text{Formula (1)}$$

The maximum likelihood L is expressed, for example, with the following formula.

$$L = -\Sigma_{k=1}^{M} RSS_k / 2d \qquad \text{Formula (2)}$$

In formula (2), $RSS_k$ represents the square root of the distance from the cluster centroid of all members of the provisional clusters k, and d represents the distribution of members.

Moreover, the number of freedom parameters K is expressed, for example, with the following formula.

$$K = M \times D \qquad \text{Formula (3)}$$

In formula (3), M represents the number of clusters, and D represents the dimension number of the feature value.

However, evaluation standards (for example, Bayesian Information Criterion (BIC)) other than Akaike's Information Criterion may also be used.

The separability between the provisional clusters is evaluated, for example, by using the distance between the respective provisional clusters. The distance between the provisional clusters is calculated, for example, by calculating the interfaces capable of separating the provisional clusters with a multi-class support vector machine, and, with the total value of the margin (distance) between the respective provisional clusters as $M_N$, as the average degree of separation $B(N)$ between the provisional clusters according to the following formula.

$$B(N)=M_N/NC2 \quad \text{Formula (4)}$$

Note that, in formula (4), N represents the number of clusters.

The average degree of separation $B(N)$ between the provisional clusters is an index which represents the level of separation between the provisional clusters described above, and, as this value is greater, it represents that the provisional clusters are more separated. Moreover, the average degree of separation between provisional clusters may be any kind of index so as long as it increased as the average distance between the respective provisional clusters is great, and the average value of the distance between the respective sets $\{C_k\}$ of the cluster centroids may also be applied.

The clustering execution unit 36 calls the cluster centroid trajectory generation unit 37 (FIG. 2) when the clustering execution processing of each of the target time series position data is completed.

When the cluster centroid trajectory generation unit 37 is called by the clustering execution unit 36, the cluster centroid trajectory generation unit 37 generates the time series position data of a time domain of the cluster centroids of the respective provisional clusters, and displays, on the I/O device 18 (FIG. 1), the waveform based on the obtained time series position data of the respective provisional clusters (SP16).

Specifically, the cluster centroid trajectory generation unit 37 generates, for each cluster, complex number data of a frequency domain in which first half of the data of the cluster centroid obtained in the foregoing clustering execution processing is a real part and the second half of the data of the cluster centroid obtained in the foregoing clustering execution processing is an imaginary part, and transforms the generated complex number data into complex number data representing the position information by performing inverse Fourier transformation. Moreover, the cluster centroid trajectory generation unit 37 generates the time series position data of the cluster centroid with the real part of the complex number data (position information) as the latitude and the imaginary part as the longitude. Subsequently, the cluster centroid trajectory generation unit 37 displays the trajectory of the cluster centroid of the respective clusters on the I/O device 18, for example, in the format shown in FIG. 15, based on the time series position data of the cluster centroid of the respective provisional clusters generated as described above.

Figure 15:
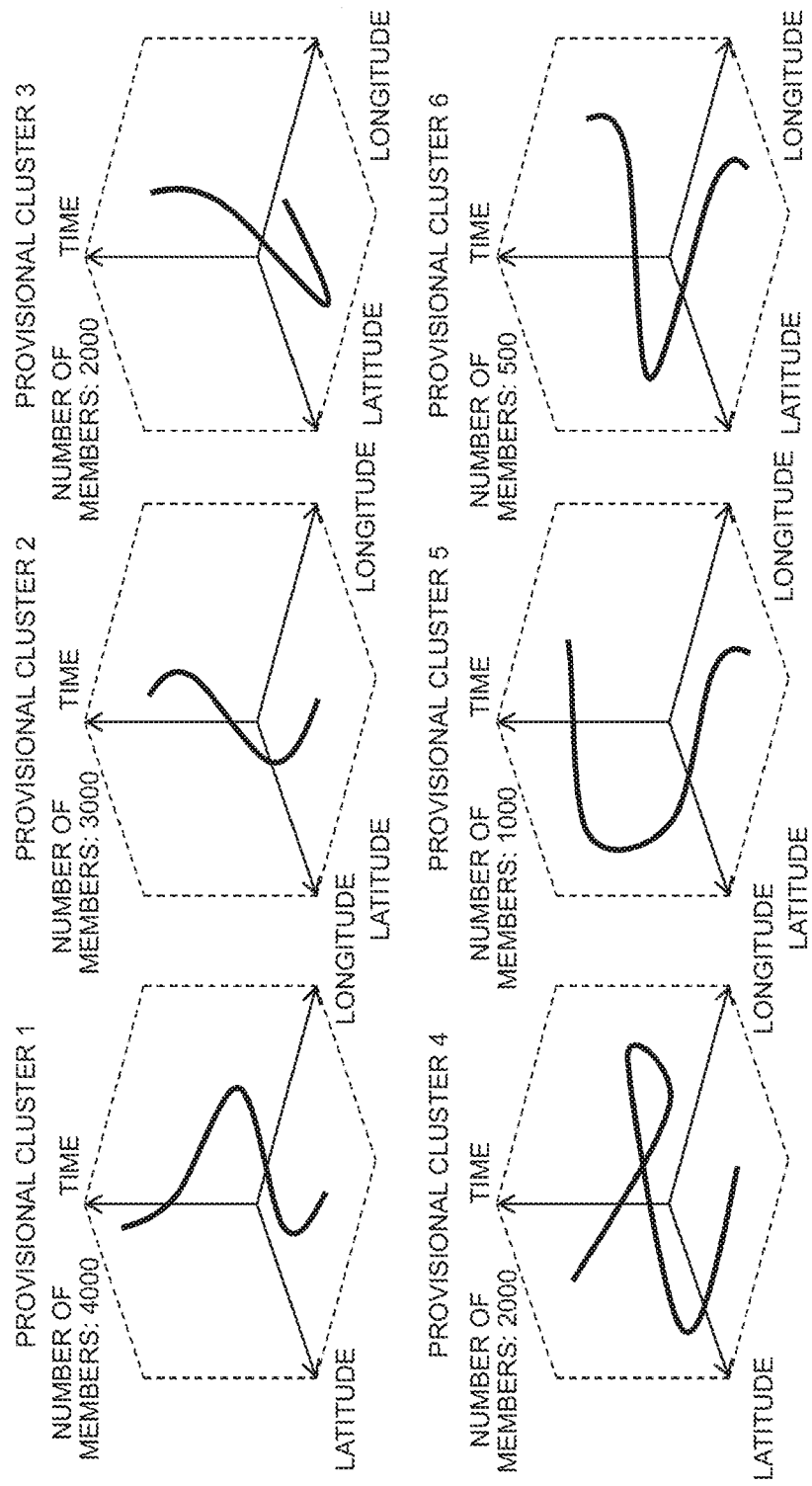
FIG. 15 is a schematic diagram schematically showing a display example of the processing result of the clustering processing.

FIG. 15 shows an example of a case where the time series position data of each user is classified into six provisional clusters, and represents a display example in which the trajectory of the cluster centroid of the provisional clusters is drawn on three-dimensional coordinates having the respective axes of latitude, longitude and time. As a result of drawing the trajectory of the cluster centroid of the provisional clusters on three-dimensional coordinates having the respective axes of latitude, longitude and time, it is possible to display the representative movement pattern of the provisional cluster-affiliated users as a waveform which gives consideration to the position and mobile speed. Moreover, the cluster centroid trajectory generation unit 37 additionally displays the number of members (number of users) affiliated with the respective provisional clusters.

Figure 16:
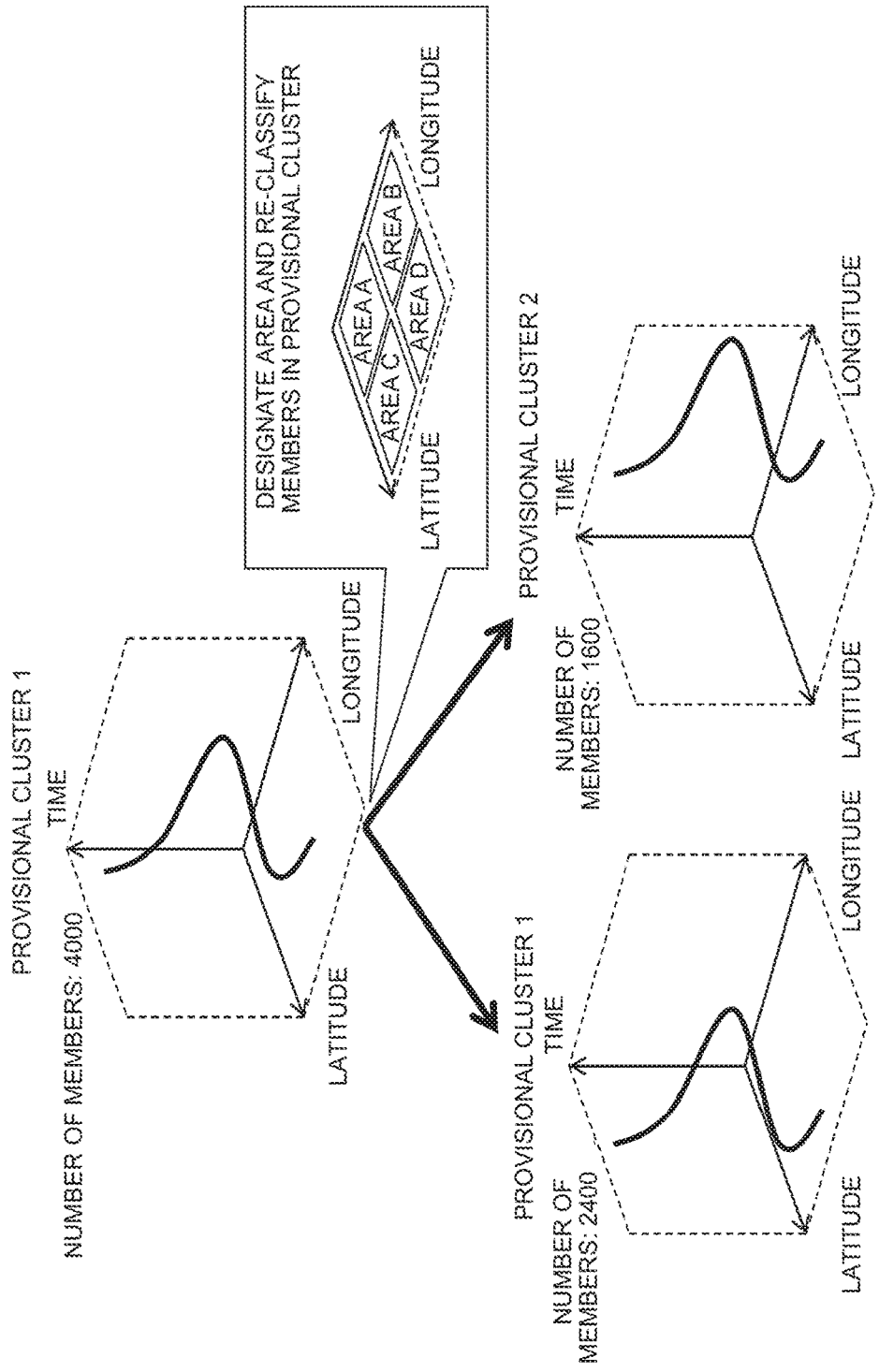
FIG. 16 is a schematic diagram schematically showing a display example of the processing result of the clustering processing.
Figure 17:
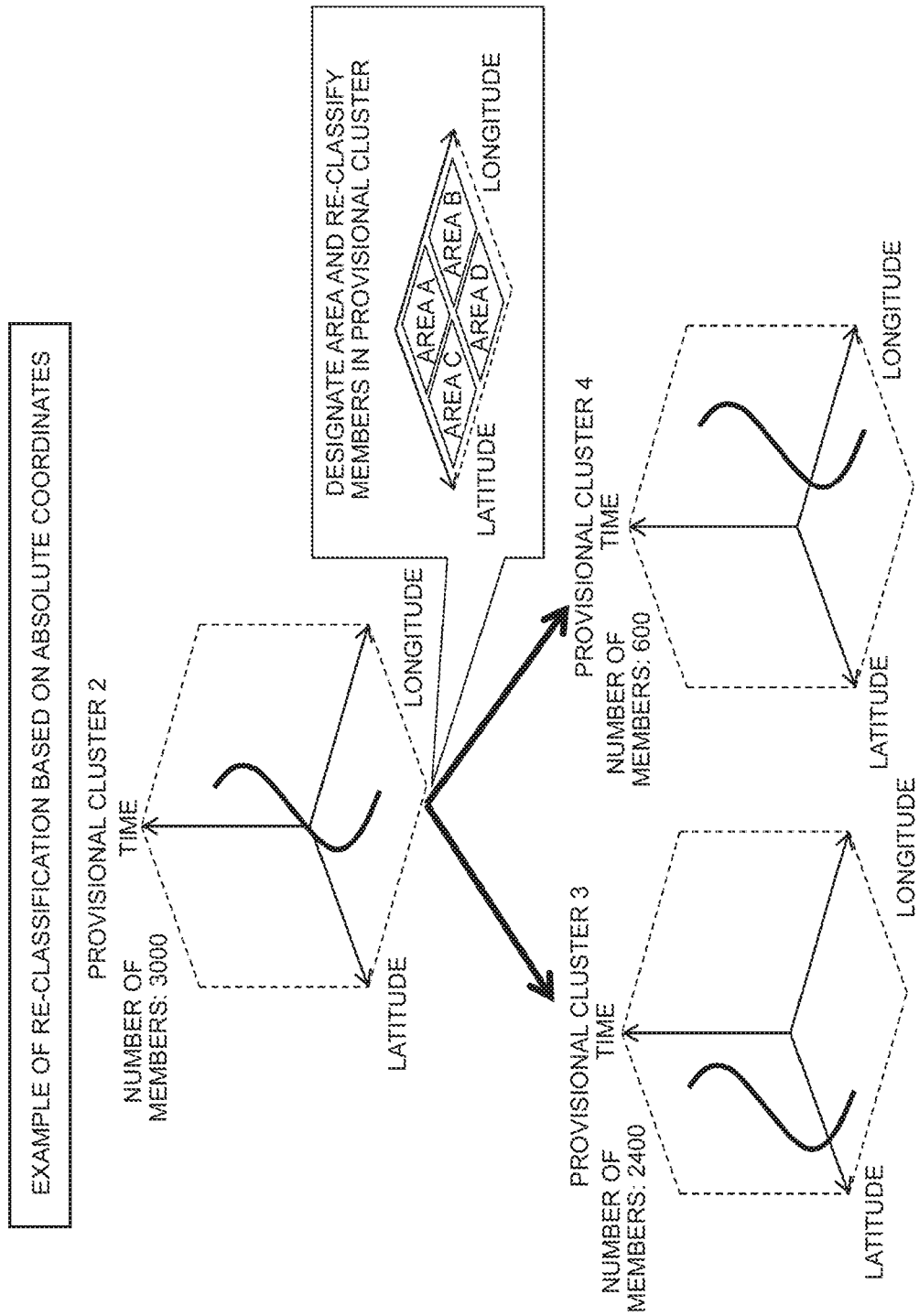
FIG. 17 is a schematic diagram schematically showing a display example of the processing result of the clustering processing.

Subsequently, the cluster centroid trajectory generation unit 37 determines whether or not the coordinate axis of the time series position data is a relative coordinate axis, and, upon obtaining a positive result, re-classifies the respective provisional clusters based on the absolute coordinate axis (SP17). As this kind of re-classification method, for example, considered may be a method of re-classification per area through which users allocated to the provisional clusters passed through during a specific time period (for instance, period until a certain time elapses from the data start time). This kind of re-classification method is shown in FIG. 16 and FIG. 17. The cluster centroids after re-classification are rearranged, for example, based on the average position of a specific time period of the users in the cluster after re-classification.

Figure 18:
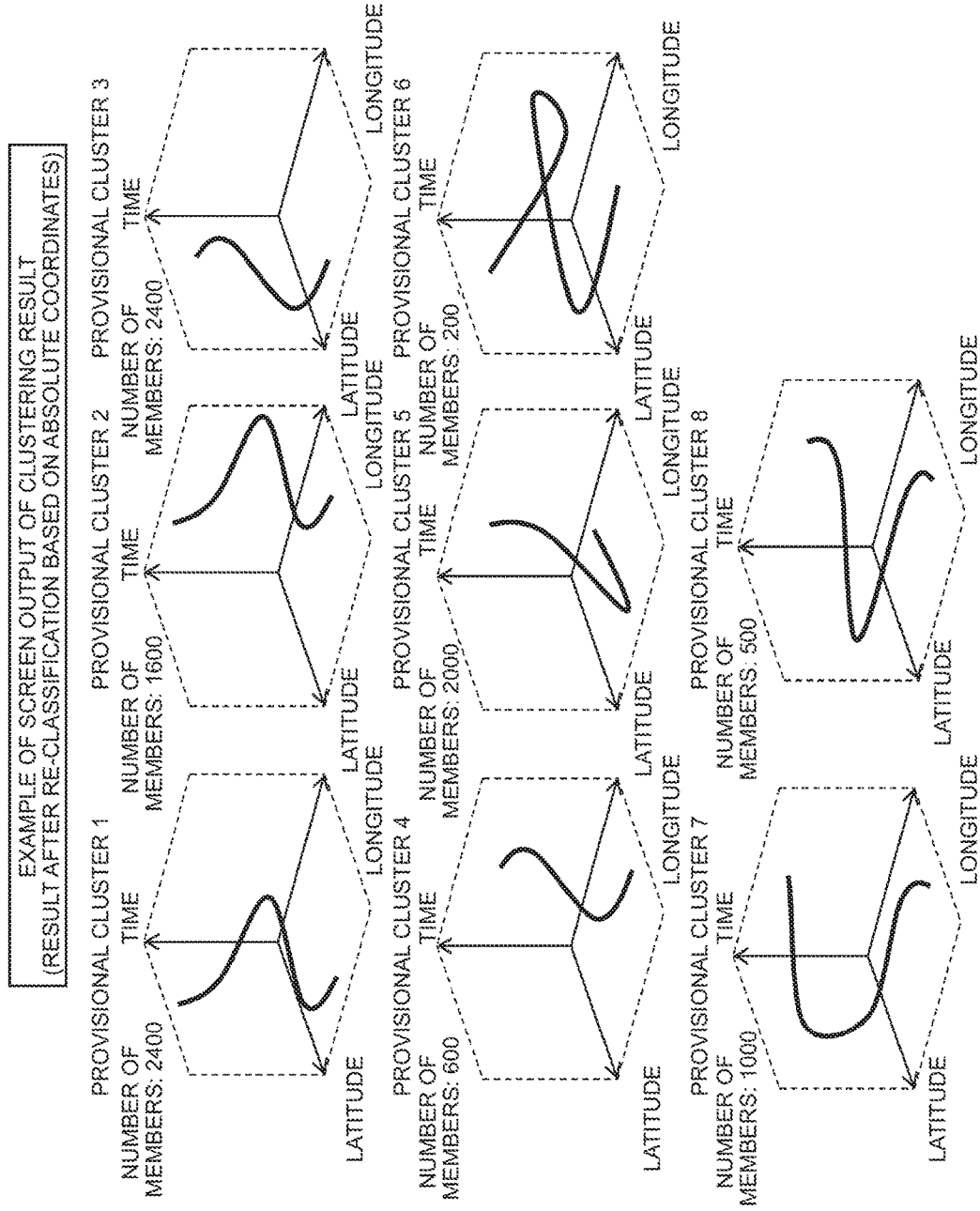
FIG. 18 is a schematic diagram schematically showing a display example of the processing result of the clustering processing.

FIG. 18 shows a display example of the processing result of the clustering processing after the foregoing re-classification is performed. Here, in addition to the waveform of the cluster centroid, the original waveform representing the movement pattern of users in which the time series position data is allocated to the respective clusters may also be displayed. Moreover, upon displaying the clustering results shown in FIG. 15 and FIG. 18, in order to understand the level of variation in the trajectory of the cluster centroids of the time series position data of users in the respective clusters, for instance, it is also possible to calculate the hourly variance of the time series position data of users in the respective clusters, and display the line indicating the trajectory of the cluster centroids of each hour according to the distribution values by changing the thickness of that line.

Subsequently, the cluster centroid trajectory generation unit 37 registers the processing result of the clustering processing in the user classification information table 25 (FIG. 4).

As a result of the foregoing processing, the clustering processing executed by the clustering processing unit 20 (FIG. 2) is ended.

(3-3) Profiling Processing

Figure 19:
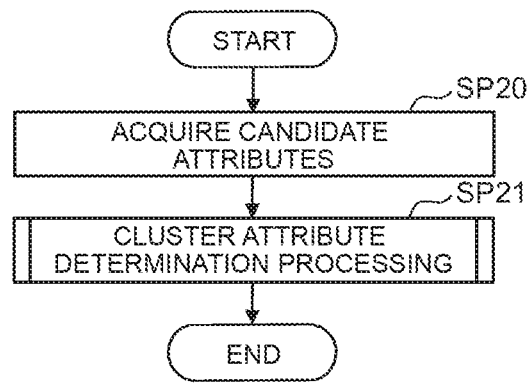
FIG. 19 is a flowchart showing the processing routine of the profiling processing.

Meanwhile, FIG. 19 shows the specific processing flow of the profiling processing to be executed by the profiling processing unit 21 (FIG. 2) in step SP2 of FIG. 10.

In the profiling processing, the candidate attribute acquisition unit 38 (FIG. 2) foremost reads, from the candidate attribute table 27 (FIG. 6), the items that may become the attributes of the cluster and the values (attributes) thereof (SP20). The candidate attribute acquisition unit 38 thereafter calls the per-cluster attribute determination unit 39 (FIG. 2).

Moreover, when the per-cluster attribute determination unit 39 is called by the candidate attribute acquisition unit 38, the per-cluster attribute determination unit 39 determines the dominant attributes of each cluster based on the user attribute information database 26 (FIG. 1) and the candidate attribute table 27, for example, through diagnostic tree learning, and registers the determination result in the per-cluster attribute information table 28 (FIG. 7) (SP21).

Note that, while this embodiment uses an ID 3 (Iterative Dichotomiser 3) as the creation algorithm of the diagnostic decision tree used in the diagnostic tree learning, algorithms such as C4.5, CART (Classification And Regression Trees), and ID 3-plural other than ID 3 may also be used.

As a result of the foregoing processing, the profiling processing is ended.

Figure 20:
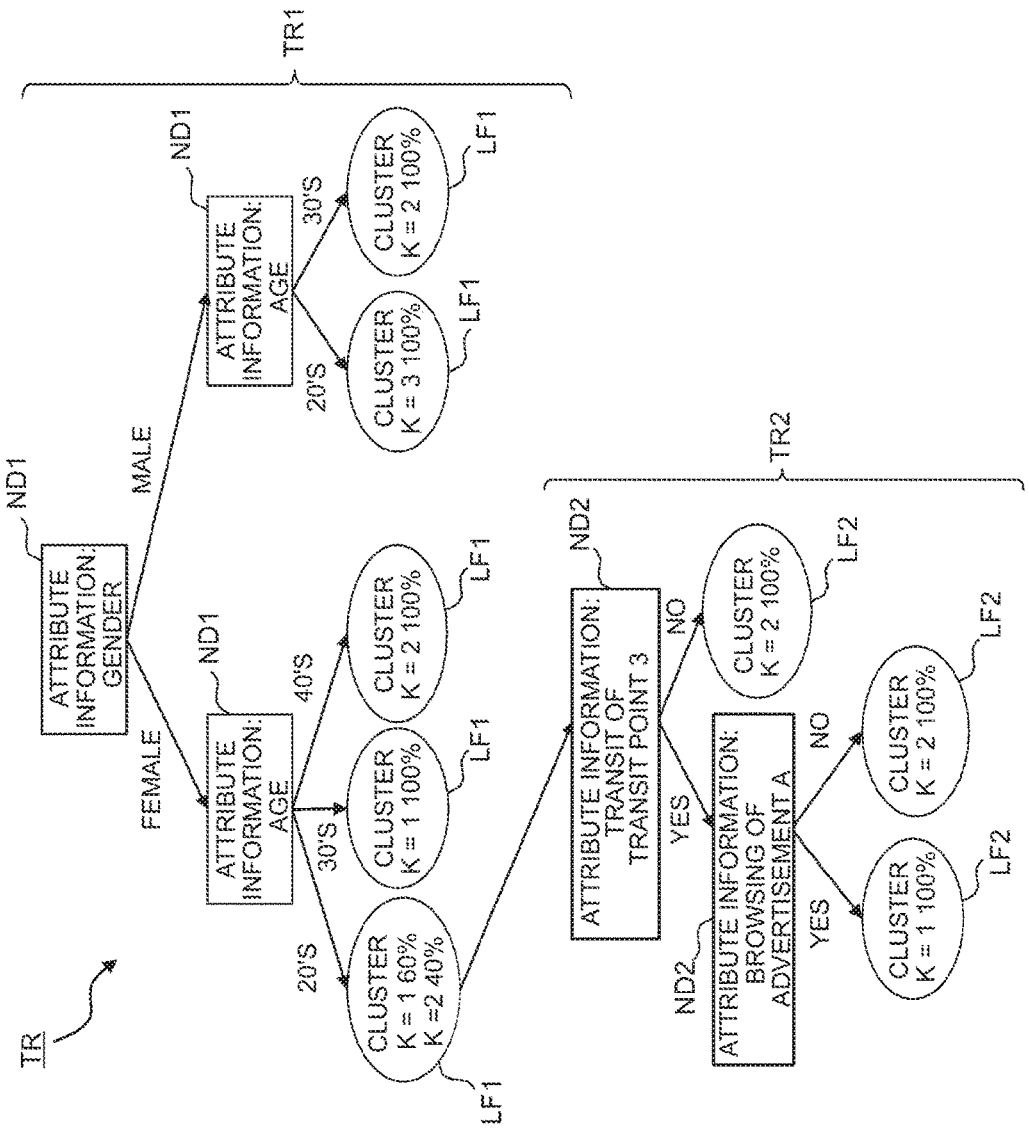
FIG. 20 is a conceptual diagram showing a configuration example of the diagnostic decision tree.

Here, FIG. 20 shows the schematic configuration of the diagnostic decision tree TR generated in the foregoing profiling processing. The processing of generating the diagnostic decision tree TR is the processing of generating, in an integrated manner, the diagnostic decision tree TR for estimating the clusters related to the respective users based on the attribute information of the respective users registered in the user attribute information database 26 (FIG. 1). The diagnostic decision tree TR is configured from a first diagnostic decision tree TR1 and a second diagnostic decision tree TR2 as evident from FIG. 20.

The first diagnostic decision tree TR1 is a diagnostic tree that is created based only on the position and attribute information during the analyzing period of the respective users. In effect, with the first diagnostic decision tree TR1, the contents of the respective nodes ND1 are only those related to the movement status of the user recognized based on the time series position data and the attribute information of users, and users can be associated with one of the clusters based only on the user's attribute information.

Moreover, the second diagnostic decision tree TR2 is a diagnostic tree that is created based on the supplementary information of users (attribute information of the cluster with which the users are affiliated) obtained by analyzing the time series position data during the analyzing period of existing users allocated to the leaf LF1, with the leaf LF1 among the respective leaves LF1 of the first diagnostic decision tree TR1 in which the cluster of the allocation destination is not clear (cluster of the allocation destination is not yet determined to be a specific cluster) as the root. In effect, with the second diagnostic decision tree TR2, the contents of the respective nodes ND2 are only those related to the supplementary information of users, and users can be associated with one of the clusters based only on the user's attribute information.

Figure 21:
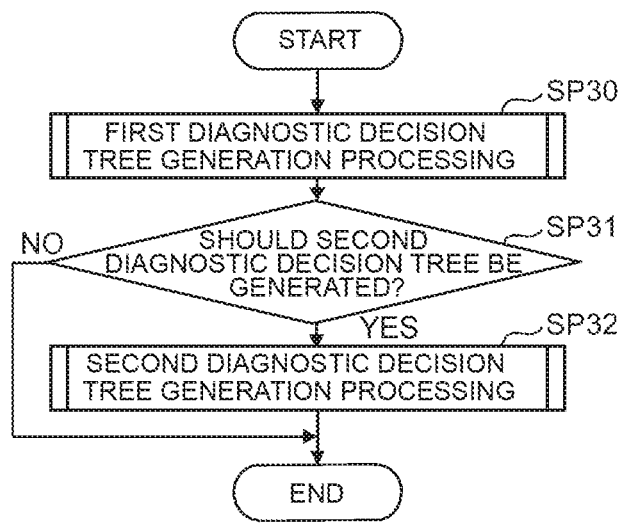
FIG. 21 is a flowchart showing the processing routine of the cluster attribute determination processing.

FIG. 21 shows the specific processing contents of the diagnostic decision tree generation processing to be executed by the per-cluster attribute determination unit 39 (FIG. 2) for generating the diagnostic decision tree TR.

When the per-cluster attribute determination unit 39 proceeds to step SP21 of FIG. 19, the per-cluster attribute determination unit 39 starts the diagnostic decision tree generation processing shown in FIG. 21, and foremost refers to the user classification information table 25 (FIG. 4) and the per-cluster attribute information table 28 (FIG. 7), and generates the first diagnostic decision tree TR1 (SP30).

Subsequently, the per-cluster attribute determination unit 39 determines whether there is a leaf LF1 in which the cluster of the allocation destination in the first diagnostic decision tree TR1 has not yet been determined to be a specific cluster (SP31). When the per-cluster attribute determination unit 39 obtains a negative result in this determination, the per-cluster attribute determination unit 39 ends the diagnostic decision tree generation processing.

Meanwhile, when the per-cluster attribute determination unit 39 obtains a positive result in the determination of step SP31, the per-cluster attribute determination unit 39 refers to the per-cluster attribute information table 28 and generates the second diagnostic decision tree TR2 (SP32), and thereafter ends the diagnostic decision tree generation processing.

Figure 22:
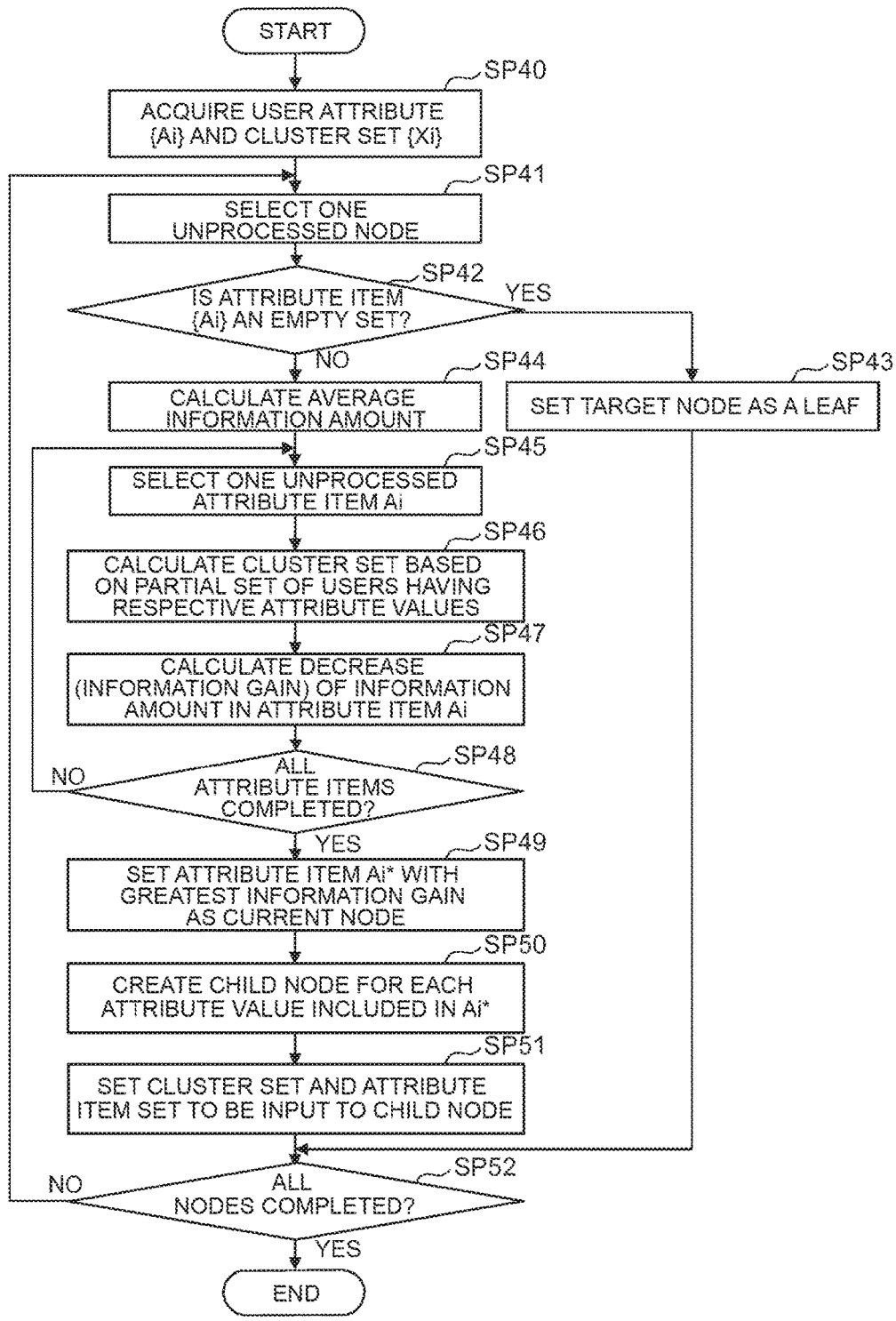
FIG. 22 is a flowchart showing the processing routine of the first diagnostic decision tree generation processing.

FIG. 22 shows the specific processing contents of the first diagnostic decision tree generation processing to be executed by the per-cluster attribute determination unit 39 in step SP30 of the diagnostic decision tree generation processing (FIG. 21). When the per-cluster attribute determination unit 39 proceeds to step SP30 of the diagnostic decision tree generation processing, the per-cluster attribute determination unit 39 starts the first diagnostic decision tree generation processing shown in FIG. 22, and foremost acquires the cluster information $\{X_k\}$ obtained based on the clustering execution processing described above with reference to step SP15 of FIG. 11, and the attribute item $\{A_i\}$ of the respective users (SP40).

Subsequently, the per-cluster attribute determination unit 39 selects one unprocessed node (SP41). Note that, because the per-cluster attribute determination unit 39 starts the processing of step SP41 onward from the processing from the root (top-level node) of the diagnostic decision tree TR to be generated at such time, the root is selected in step SP41 to be executed first.

Subsequently, the per-cluster attribute determination unit 39 determines whether the user's attribute item $\{Ai\}$ acquired in step SP40 is an empty set (SP42). When the per-cluster attribute determination unit 39 obtains a positive result in this determination, the per-cluster attribute determination unit 39 sets the node selected in step SP40 as the (terminal node) (SP43), and thereafter proceeds to step SP52.

Meanwhile, when the per-cluster attribute determination unit 39 obtains a negative result in the determination of step SP42, the per-cluster attribute determination unit 39 calculates, based on the following formula, the average information amount H of the cluster of all users included in the current cluster information (SP44).

$$H(\{X_k\})=\Sigma_k(|X_k|/\Sigma_n|X_n|)\log(|X_k|/\Sigma_n|X_n|) \quad \text{Formula (5)}$$

Note that, in formula (5), $|X_k|$ represents the number of users included in the cluster k.

The average information amount $H(|X_k|)$ is greater as the variation in the cluster with which the user's time series position data that was input is affiliated, and takes on a greater value as the deviation is greater. When the time series position data of each user that was input is only affiliated with one cluster, the average information amount $H(|X_k|)$ will be "0".

The per-cluster attribute determination unit 39 thereafter selects one unprocessed attribute item $A_1$ from the input attribute items $\{A_i\}$ (SP45), and calculates the cluster set $\{Y_{K,j}\}$ in the subset of users who have the values $a_{i,1}, a_{i,2}, a_{i,3}, \ldots$ included in the selected attribute item $A_i$ as the attribute value, and the number of users $|Y_{K,j}|$ thereof (SP46).

The per-cluster attribute determination unit 39 calculates, based on the following formula, the information gain $IG(A_i)$ of the attribute item $A_i$ selected in step SP45.

$$IG(A_i)=H(\{X_k\})=\Sigma_j\Sigma_k(|Y_{k,j}|/\Sigma_n|Y_{n,j}|)\log(|Y_{k,j}|/\Sigma_n|Y_{n,j}|) \quad \text{Formula (6)}$$

Note that the information gain $IG(A_i)$ is a parameter which represents to what extent the variation of the clusters, to which users will be affiliated upon partially dividing the users based on the attribute values $a_{i,1}, a_{i,2}, a_{i,3}, \ldots$, will decrease.

Subsequently, the per-cluster attribute determination unit 39 determines whether the information gain $IG(A_i)$ has been calculated for all input attribute items $\{A_i\}$ (SP47). When the per-cluster attribute determination unit 39 obtains a negative result in this determination, the per-cluster attribute determination unit 39 returns to step SP45, and thereafter repeats the processing of step SP45 to step SP48 while sequentially switching the attribute item $A_i$ selected in step SP45 to another unprocessed node.

When the per-cluster attribute determination unit 39 obtains a positive result in step SP48 as a result of completing the calculation of the information gain IG($A_i$) for all attribute items {$A_i$}, the per-cluster attribute determination unit 39 sets the attribute item $A_i^*$ having the greatest information gain IG($A_i$) as the current node of the diagnostic decision tree TR (SP49), and creates a child node for each of the attribute values $a_{i^*, 1}$, $a_{i^*, 2}$, $a_{i^*, 3}$, of the attribute item $A_i^*$ (SP50).

Subsequently, with regard to the attribute values $a_{i^*, 1}$, $a_{i^*, 2}$, $a_{i^*, 3}$, . . . of the attribute item $A_i^*$ described above, the per-cluster attribute determination unit 39 associates the cluster subset {$Y_{K, j}$} regarding users having the attribute value $a_{i^*, j}$ as a new cluster set {$X_k$} of the corresponding child node. Moreover, the subset {$A_i/A_i^*$} of attribute items excluding the attribute item $A_i^*$ with the largest information gain IG($A_i$) described above is associated as a new attribute set {$A_i$} of the respective child nodes (SP51).

The per-cluster attribute determination unit 39 thereafter determines whether the processing of step SP42 to step SP51 has been executed for all nodes (SP52). Subsequently, the per-cluster attribute determination unit 39 returns to step SP41 upon obtaining a negative result in this determination, and thereafter repeats the processing of step SP41 to step SP52 while sequentially switching the node selected in step SP41 to another unprocessed node.

When the per-cluster attribute determination unit 39 eventually obtains a positive result in step SP52 as a result of determining the attribute information $A_i^*$ for all nodes, the per-cluster attribute determination unit 39 ends the first diagnostic decision tree generation processing.

Figure 23:
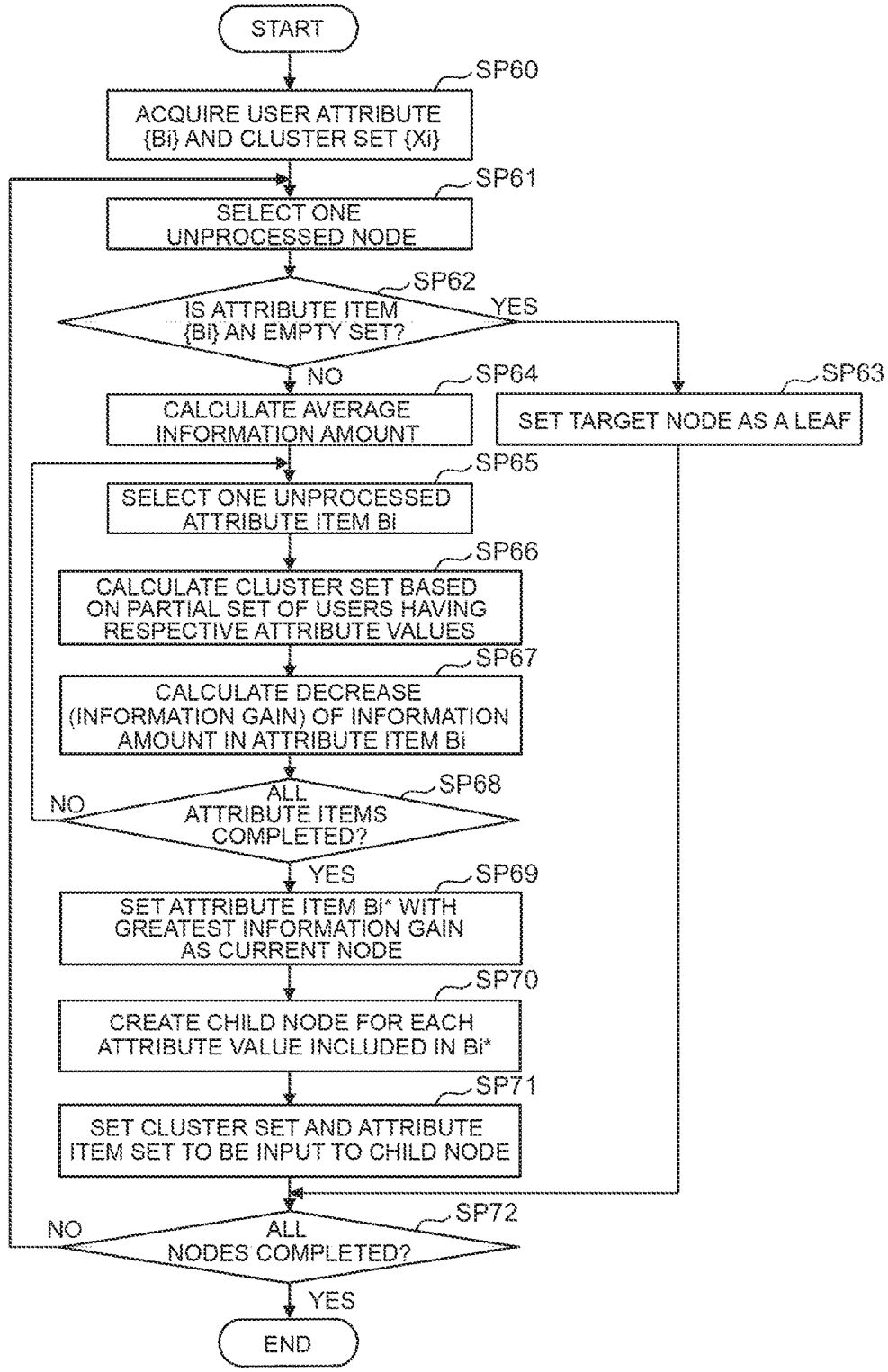
FIG. 23 is a flowchart showing the processing routine of the second diagnostic decision tree generation processing.

Meanwhile, FIG. 23 shows the specific processing contents of the second diagnostic decision tree generation processing to be executed by the per-cluster attribute determination unit 39 in step SP32 of the diagnostic decision tree generation processing (FIG. 21). The second diagnostic decision tree generation processing shown in FIG. 23 is executed by the per-cluster attribute determination unit 39 upon creating the second diagnostic decision tree TR2 (FIG. 20) based on the supplementary information of users as attribute item {Bi} with regard to the leaf LF1 among the respective leaves LF1 of the first diagnostic decision tree TR1 generated in the first diagnostic decision tree generation processing described above with reference to FIG. 22 in which the cluster of the allocation destination is not clear (cluster of the allocation destination is not yet determined to be a specific cluster).

Since the processing contents of step SP60 to step SP72 of the second diagnostic decision tree generation processing are the same as step SP40 to step SP52 of the first diagnostic decision tree generation processing described above with reference to FIG. 22 other than the point of using supplementary information as an input item, the detailed explanation thereof is omitted.

Note that, while a case was explained of using ID 3 in the first diagnostic decision tree generation processing described above with reference to FIG. 22 and in the second diagnostic decision tree generation processing described above with reference to FIG. 23, any method may be adopted so as long as it is a method which generates a decision tree capable of diagnosing clusters, and a generation method of a diagnostic decision tree that is different from the generation method of the first and second diagnostic decision trees TR1, TR2.

(3-4) Information Distribution Event Determination/Execution Processing

Figure 24:
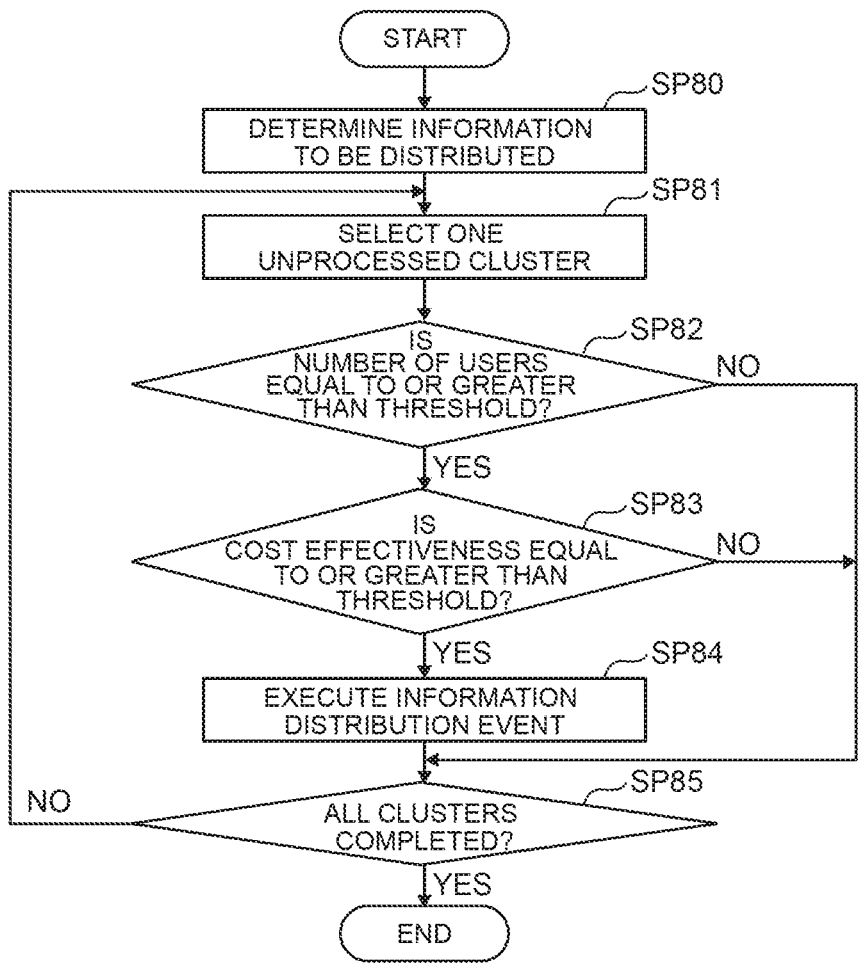
FIG. 24 is a flowchart showing the processing routine of the information distribution event determination/execution processing.

FIG. 24 shows the specific processing contents of the information distribution event determination/execution processing to be executed by the information distribution event determination/execution unit 22 (FIG. 2) in step SP3 of FIG. 10. In the ensuing explanation, the processing contents of two types of information distribution event determination/execution processing; specifically, a case of distributing information to users in which the time series position data is affiliated with one of the clusters and a case of distributing information to many and unspecified number of persons.

(3-4-1) Information Distribution Targeting Cluster Members

Foremost, the processing contents of the information distribution event determination/execution processing of a case of distributing information to users in which the time series position data is affiliated with one of the clusters are explained.

In the foregoing case, foremost, information distribution event determination unit 40 (FIG. 2) of the information distribution event determination/execution unit 22 refers to the per-cluster attribute information table 28 (FIG. 7) and the distribution candidate information table 29 (FIG. 8), and determines, for each cluster, the information (distribution information) to be distributed to the respective users belonging to that cluster based on the identified attribute information (SP80).

Specifically, the information distribution event determination unit 40 determines, as the distribution information of that cluster, the distribution candidate information in which the number of coincidences of the dominant attribute of users affiliated with a certain cluster in the per-cluster attribute information table 28, and the attribute items of the distribution candidate information table 29 is equal to or greater than a pre-set threshold (this is hereinafter referred to as the "coincident attribute item count threshold").

For example, in the examples shown in FIG. 7 and FIG. 8, when the coincident attribute item count threshold is "3", with the cluster having a cluster ID of "1" registered in the per-cluster attribute information table 28, the three items of "age", "gender" and "transit point" coincide with the values of the corresponding attribute items of the distribution candidate information in which the distribution information ID registered in the distribution candidate information table 29 is "2", the distribution candidate information of "discount coupon information of a lady's fashion store around C store" is determined as the distribution information to be distributed to the cluster-affiliated user having a cluster ID of "1".

Note that, in this embodiment, while the distribution candidate information table 29 is created manually in advance, for instance, the values of the respective item columns 29BA to 29BD of the attribute item column 29B of the distribution candidate information table 29 may also be determined based on the processing results of past profiling processing such as by the information distribution event determination unit 40 preparing information to be distributed regarding the attributes of a cluster having a certain number of users or more.

The information distribution event determination unit 40 calls the information distribution event execution unit 41 (FIG. 2) after generating the information distribution event.

When the information distribution event execution unit 41 is called by the information distribution event determination unit 40, the information distribution event execution unit 41 distributes information to the cluster-affiliated user for each cluster by executing the processing of step SP81 to step SP85.

In effect, the information distribution event execution unit 41 foremost selects one unprocessed cluster (SP81), and determines whether the number of cluster-affiliated users is equal to or greater than a pre-set threshold (this is hereinafter referred to as the "user count threshold") (SP82). This is in order to limit the target of the execution of the information distribution event (event of distributing distribution candidate information to be distributed which was selected in step SP80) to clusters in which the number of users is equal to or greater than the user count threshold.

Subsequently, the information distribution event execution unit 41 proceeds to step SP85 upon obtaining a negative result in this determination, and, upon obtaining a positive result in the determination of step SP82, determines whether the cost effectiveness score of the event of distributing the distribution information determined in step SP80 regarding the cluster selected in step SP81 is equal to or greater than a pre-set threshold regarding the cost effectiveness (this is hereinafter referred to as the "cost effectiveness threshold") (SP83). This is in order to limit the target of information distribution to clusters in which the cost effectiveness score is equal to or greater than the cost effectiveness threshold.

Subsequently, the information distribution event execution unit 41 proceeds to step SP85 upon obtaining a negative result in this determination, and, upon obtaining a positive result in the determination of step SP83, distributes the distribution information selected in step SP80 regarding the cluster selected in step SP81 (SP84).

Specifically, the information distribution event execution unit 41 distributes, via email, the distribution information selected in step SP80 regarding that cluster to the mobile terminal 2 of all users belonging to the cluster selected in step SP81. However, rather than distributing the information via email, for instance, if there is any transit point as a dominant attribute of the target cluster-affiliated user, the distribution information may also be distributed to an information distribution terminal (electronic bulletin board or the like) around that transit point. The distribution timing of this kind of distribution information may be at a timing where, upon collecting the user's position information in real time, the user passes through the transit point.

Moreover, as a different method of determining the distribution timing of information in cases where there is a transit point as a dominant attribute of the target cluster-affiliated user, it is also possible to estimate the time that the target cluster-affiliated user will appear at the transit point by coordinating with the information service used by the user, and distribute information at such time. For example, it is also possible to estimate the time that the user will appear at the transit point from the user's transit guidance service usage history, and distribute information to an information distribution terminal (electronic bulletin board or the like) around the transit point by using a timer, irrespective of the user's actions on that day. Moreover, for instance, it is also possible to estimate the user's starting point based on the user's transit guidance service usage history, and distribute information to an information distribution terminal (electronic bulletin board or the like) located between the starting point and the transit point.

Subsequently, the information distribution event execution unit 41 determines whether the processing of step SP82 to step SP84 has been executed for all clusters (SP85). The information distribution event execution unit 41 returns to a step SP81 upon obtaining a negative result in this determination, and thereafter repeats the processing of step SP81 to step SP85 while sequentially switching the cluster selected in step SP81 to another unprocessed cluster.

The information distribution event execution unit 41 ends the processing upon eventually obtaining a positive result in step SP85 as a result of executing the processing of step SP82 to step SP84 for all clusters. The series of information distribution event determination/execution processing executed by the information distribution event determination/execution unit 22 (FIG. 2) is thereby ended.

(3-4-2) Information Distribution Targeting Many and Unspecified Number of Persons The processing contents of the information distribution event determination/execution processing in the case of distributing information to many and unspecified number of persons are now explained with reference to FIG. 24.

In the foregoing case, the information distribution event determination unit 40 foremost refers to the per-cluster attribute information table 28 (FIG. 7) and the distribution candidate information table 29 (FIG. 8), and determines, for each cluster, the information (distribution information) to be distributed to the respective users belonging to that cluster based on the attribute information identified for each cluster (SP80).

Specifically, the information distribution event determination unit 40 acquires, from the user classification information table 25 (FIG. 4), a certain number of cluster IDs of clusters with a large number of sample users. The information distribution event determination unit 40 selects as distribution information, from the distribution candidate information table 29, distribution candidate information in which the number of coincidences of the dominant attribute in the per-cluster attribute information table 28 of the acquired cluster ID and the attribute items of the distribution candidate information table 29 is equal to or greater than the foregoing coincident attribute item count threshold.

The information distribution event determination unit 40 thereafter calls the information distribution event execution unit 41.

When the information distribution event execution unit 41 is called by the information distribution event determination unit 40, the information distribution event execution unit 41 distributes information to many and unspecified number of persons by executing the processing of step SP81 to step SP85.

In effect, the information distribution event execution unit 41 executes the processing of step SP81 to step SP8 in the same manner as the processing of "(3-4-1) Information distribution targeting cluster members".

Subsequently, the information distribution event execution unit 41 distributes the distribution information determined in step SP80 based on information distribution means targeting many and unspecified number of persons (SP84). Here, as the information distribution means targeting many and unspecified number of persons, for example, other information distribution means may be used so as long as it is able to present information to people, such as an advertisement via media such as TV, radio or internet, or an advertisement via a paper medium such as newspapers or posters.

Moreover, as a different method of determining the distribution timing of information in cases where there is a transit point as a dominant attribute of the target cluster-affiliated user, it is also possible to estimate the time that the target cluster-affiliated user will appear at the transit point by coordinating with the information service used by the user, and distribute information at such time. For example, it is also possible to estimate the time that the user will appear at the transit point from the user's transit guidance service usage history, and distribute information to an information distribution terminal (electronic bulletin board or the like) around the transit point by using a timer, irrespective of the user's actions on that day. Moreover, for instance, it is also possible to estimate the user's starting point based on the user's transit guidance service usage history, and distribute information to an information distribution terminal (electronic bulletin board or the like) located between the starting point and the transit point.

Subsequently, the information distribution event execution unit 41 determines whether the processing of step SP82 to step SP84 has been executed for all clusters (SP85). The information distribution event execution unit 41 returns to a step SP81 upon obtaining a negative result in this determination, and thereafter repeats the processing of step SP81 to step SP85 while sequentially switching the cluster selected in step SP81 to another unprocessed cluster.

The information distribution event execution unit 41 ends the processing upon eventually obtaining a positive result in step SP85 as a result of executing processing of step SP82 to step SP84 for all clusters. The information distribution event determination/execution processing executed by the information distribution event determination/execution processing is thereby ended.

Figure 25:
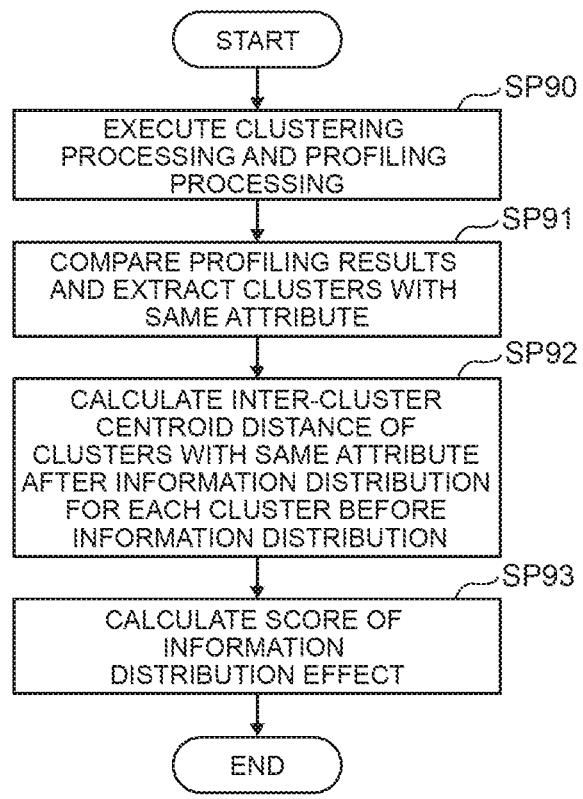
FIG. 25 is a flowchart showing the processing routine of the first information distribution event evaluation processing.

(3-5) Information Distribution Event Evaluation Processing (3-5-1) Information Distribution Event Evaluation Processing Targeting Cluster Members FIG. 25 shows the specific processing contents of the first information distribution event evaluation processing to be executed by the information distribution event execution result acquisition unit 42 (FIG. 2) of the information distribution event evaluation unit 23 (FIG. 2) in step SP4 of FIG. 10 after a certain time has elapsed after the information distribution event determination/execution processing described above with reference to FIG. 24 is ended.

The information distribution event execution result acquisition unit 42 compares the classification pattern before and after the information distribution event described above with reference to FIG. 24 and evaluates the size of change in the classification result particularly of the same attribute (greater change in the classification result of the same attribute is evaluated as being greater) according to the processing routine shown in FIG. 25.

In effect, when the information distribution event execution result acquisition unit 42 starts the first information distribution event evaluation processing, the information distribution event execution result acquisition unit 42 foremost controls the clustering processing unit 20 (FIG. 2) and the profiling processing unit 21 (FIG. 2) and causes them to execute the clustering processing described above with reference to FIG. 11 and the profile processing described above with reference to FIG. 19 to FIG. 23 (SP90).

Subsequently, the information distribution event execution result acquisition unit 42 compares the processing result of the profiling processing executed in step SP90 with the profiling result acquired before the execution of the information distribution event determination/execution processing described above with reference to FIG. 24 (that is acquired in step SP2 of FIG. 10), and extracts clusters having the same attribute or in which the number of coinciding attributes is equal to or greater than a pre-set threshold (SP91).

Subsequently, the information distribution event execution result acquisition unit 42 calculates, for each cluster before the information distribution, the distance between the cluster centroids of clusters having the same attribute after the information distribution (SP92). For example, the information distribution event execution result acquisition unit 42 calculates the foregoing distance by integrating the difference in positions (latitude, longitude) of the cluster centroids per hour.

The information distribution event execution result acquisition unit 42 calculates the cost effectiveness score of the current information distribution based on the calculation result of the distance (SP93). Specifically, the information distribution event execution result acquisition unit 42 calculates the cost effectiveness score of information distribution by dividing the event implementation cost of distribution information relative to the calculated distance. Based on this kind of calculation, for example, even when the event implementation cost is the same, a large value as the cost effectiveness score is obtained when it is considered that the user's movement pattern changed considerably due to the information distribution (foregoing distance between the cluster centroids is great), and a small value as the cost effectiveness score is obtained when it is considered that the user's movement pattern hardly changed even with the information distribution. However, it is also possible to add a score of a certain value by evaluating the point of suppressing the movement pattern of the target cluster even to the distribution information to clusters before information distribution without any cluster having the same attribute after the information distribution. The information distribution event execution result acquisition unit 42 writes the calculated cost effectiveness score over the corresponding cost effectiveness score column 29E of the distribution candidate information table 8.

The information distribution event execution result acquisition unit 42 thereafter ends the first information distribution event evaluation processing.

Figure 26:
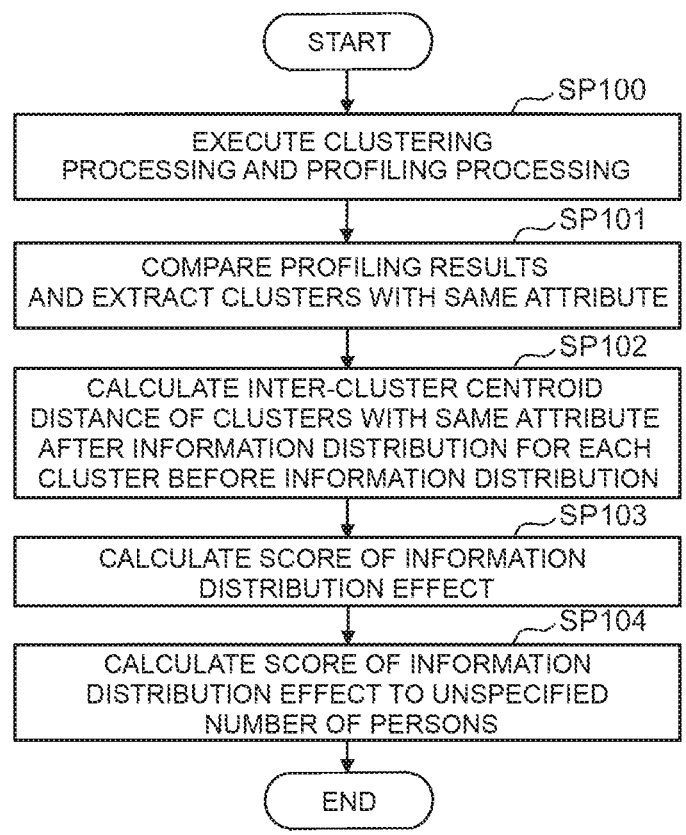
FIG. 26 is a flowchart showing the processing routine of the second information distribution event evaluation processing.

(3-5-2) Information Distribution Event Evaluation Processing Targeting Many and Unspecified Number of Persons FIG. 26 shows the specific processing contents of the second information distribution event evaluation processing to be executed by the information distribution event execution result acquisition unit 42 of the information distribution event evaluation unit 23 in step SP24 of FIG. 10 after a certain time has elapsed after the information distribution event determination/execution processing described above with reference to FIG. 25 is ended.

The information distribution event execution result acquisition unit 42 compares the classification pattern before and after the information distribution event described above with reference to FIG. 25 and evaluates the size of change in the classification result particularly of the same attribute (greater change in the classification result of the same attribute is evaluated as being greater) according to the processing routine shown in FIG. 26.

In effect, the information distribution event execution result acquisition unit 42 performs the processing of step SP100 to step SP103 in the same manner as the processing of step SP90 to step SP93 described above with reference to FIG. 25. However, in step SP103 of FIG. 26, the information distribution event execution result acquisition unit 42 calculates the distance between the cluster centroids of clusters having the same attribute after the information distribution by integrating the position information (latitude, longitude) per hour.

Subsequently, the information distribution event execution result acquisition unit 42 calculates the ultimate cost effectiveness score to many and unspecified number of persons by taking the sum of the information distribution effect scores of the respective clusters calculated in step SP103, and writes the calculated cost effectiveness score over the corresponding cost effectiveness score column 29E of the distribution candidate information table 29 (FIG. 8) (SP104).

The information distribution event execution result acquisition unit 42 thereafter ends the information distribution event evaluation processing.

(3-6) Human Flow Control Based on Information Distribution Event (3-6-1) Store Staff Count/Store Customer Count Control Processing Here, the method of estimating the number of visitors to a store, adjusting the number of store staff according to the estimated number of visitors, and controlling the number of visitors based on the event information distribution (this is hereinafter referred to as the "store staff count/store customer count control method") based on the processing results of the foregoing clustering processing and profiling processing performed to the time series position data of the respective mobile terminals 2.

Figure 27:
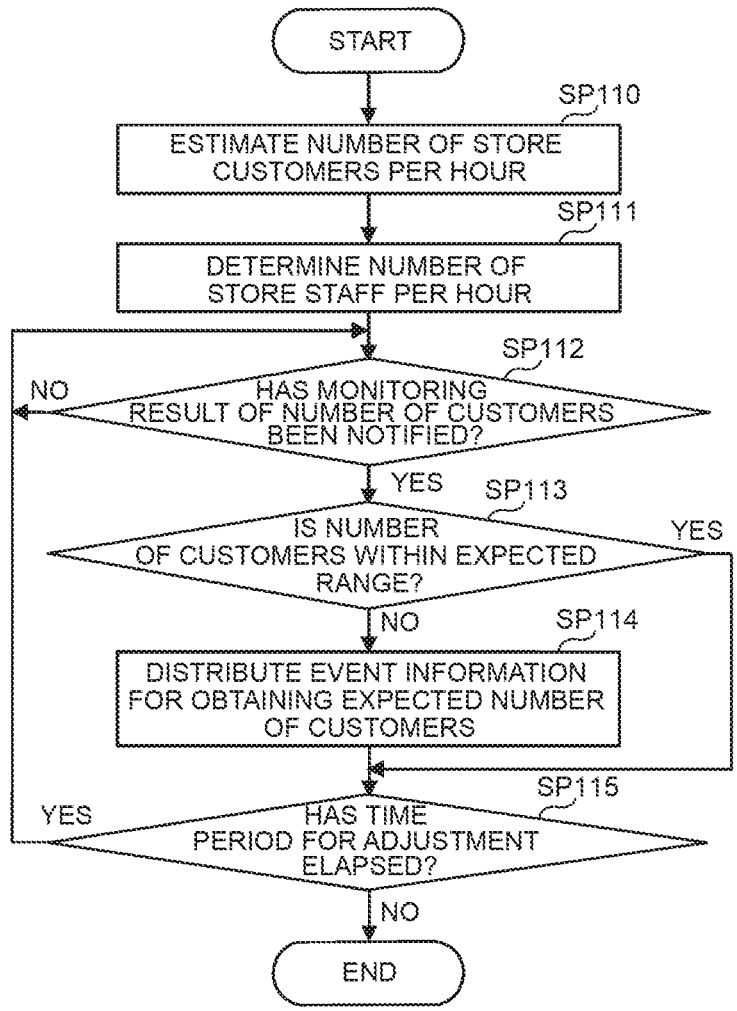
FIG. 27 is a flowchart showing the processing routine of the store staff count/store customer count control processing.

FIG. 27 shows the processing contents of the store staff count/store customer count control processing to be executed by the human flow control unit 43 (FIG. 2) of the information distribution apparatus 3 in relation to the store staff count/store customer count control method.

The human flow control unit 43 starts the store staff count/store customer count control processing when the information distribution apparatus 3 is operated and the execution order of the store staff count/store customer count control processing is input, and foremost estimates the number of store customers per hour based on the processing results of the foregoing clustering processing and profiling processing performed to the time series position data of the respective mobile terminals 2 (SP110).

In the foregoing case, it is possible to improve the estimation accuracy by treating the time series position data of different time periods (day of the week or the like) of a user as the time series position data of another user. For example, when there are one week's worth of time series position data of a user, the time series position data is divided for each day of the week, and treated as the time series position data of one day of another user in which only the "day of the week" is different as an attribute. By clustering one day's worth time series position data as described above and adding a day of the week as an attribute candidate, clusters having the day of the week as an attribute can be obtained.

By extracting clusters having a day of the week, a season or any other period as an attribute, and extracting clusters having an estimated customer visitation as an attribute and having time series position data through a store area subject to customer visitation, it is possible to estimate the number of visitors of the store per hour from the number of members of the cluster.

Moreover, when estimating the number of visitors, the distribution of time series position information of members in the cluster per hour may be calculated, and the expected number of visitors may be compensated according to the variance of the time of passing through the store. For example, the expected number of visitors is calculated based on the following formula.

[Math 7]

$$\text{Expected number of visitors} = \text{certain coefficient} \times \text{variance} \times \text{number of members in cluster} \quad (7)$$

Subsequently, the human flow control unit 43 determines the number of store staff according to the expected number of visitors for each time period (SP111). For example, the number of store staff during the corresponding time period is calculated based on the following formula, and the calculation result is recorded or displayed in a business management system such as the store's attendance management system.

[Math 8]

$$\text{Number of store staff during corresponding time period} = \text{certain coefficient} \times \text{expected number of visitors during corresponding time period} \quad (8)$$

The recorded results of the number of store staff may also be automatically notified to workers or store staff via email by the business management system.

Subsequently, the human flow control unit 43 waits to receive the monitoring result of the number of visitors to the store per unit time in the time period to be analyzed (SP112). Note that the monitoring of the number of visitors may be performed by store workers, or may be automatically performed by placing an object detection sensor at the entrance of the store. In this embodiment, the number of visitors per unit time to the store monitored as described above is manually notified on a regular basis or automatically notified to the information distribution apparatus 3.

When the human flow control unit 43 is eventually notified of the number of visitors per unit time, the human flow control unit 43 determines whether the notified number of visitors is within the range of the expected number of visitors (SP113). Here, the expected number of visitors is the value that is determined based on the foregoing expected number of visitors. For example, if the expected number of visitors is 30 visitors, the range of expected number of visitors is set to be 20 to 40 visitors. As a result of setting an upper limit and a lower limit, it is possible to reduce the risk of decrease in store sales and delay in customer service by the store staff.

Subsequently, the human flow control unit 43 proceeds to step SP115 upon obtaining a positive result in the determination of step SP113. Meanwhile, when the human flow control unit 43 obtains a negative result in the determination of step SP113, the human flow control unit 43 calls the information distribution event determination/execution unit 22 (FIG. 2), and causes the information distribution event determination/execution unit 22 to distribute event information for keeping the expected number of visitors within the range (SP114).

For example, the information distribution event determination/execution unit 22 is caused to determine the distribution information to be distributed to the members (users) of the cluster having a movement pattern that goes through the store based on the distribution candidate information table 29 (FIG. 8), and distribute such distribution information to the cluster-affiliated users. Specifically, when the expected number of visitors is lower than the lower limit, the corresponding distribution information (event information such as discount coupons) is distributed to the cluster-affiliated users. Here, the contents of the distribution information may be changed, such as increasing or decreasing the amount of discount, according to the difference between the expected number of visitors and the current number of visitors. Otherwise, the number of users to which information is to be distributed may be restricted according to the difference between the expected number of visitors and the current number of visitors.

Subsequently, the human flow control unit 43 determines whether a time period of analyzing the number of store customers has elapsed (SP115). The human flow control unit 43 returns to step SP112 upon obtaining a negative result in this determination, and thereafter repeats the processing of step SP112 to step SP115.

When the human flow control unit 43 eventually obtains a positive result in step SP115 as a result of a time period of analyzing the number of store customers having elapsed, the human flow control unit 43 ends the store staff count/store customer count control processing.

(3-6-2) Pedestrian Count Control Processing

The method of estimating the number of persons on a target street per hour, controlling the number of pedestrians by distributing event information according to the estimated number of persons, and alleviating the street congestion (this is hereinafter referred to as the "pedestrian count control method") based on the processing results of the foregoing clustering processing and profiling processing performed to the time series position data of the respective mobile terminals 2 is now explained.

Figure 28:
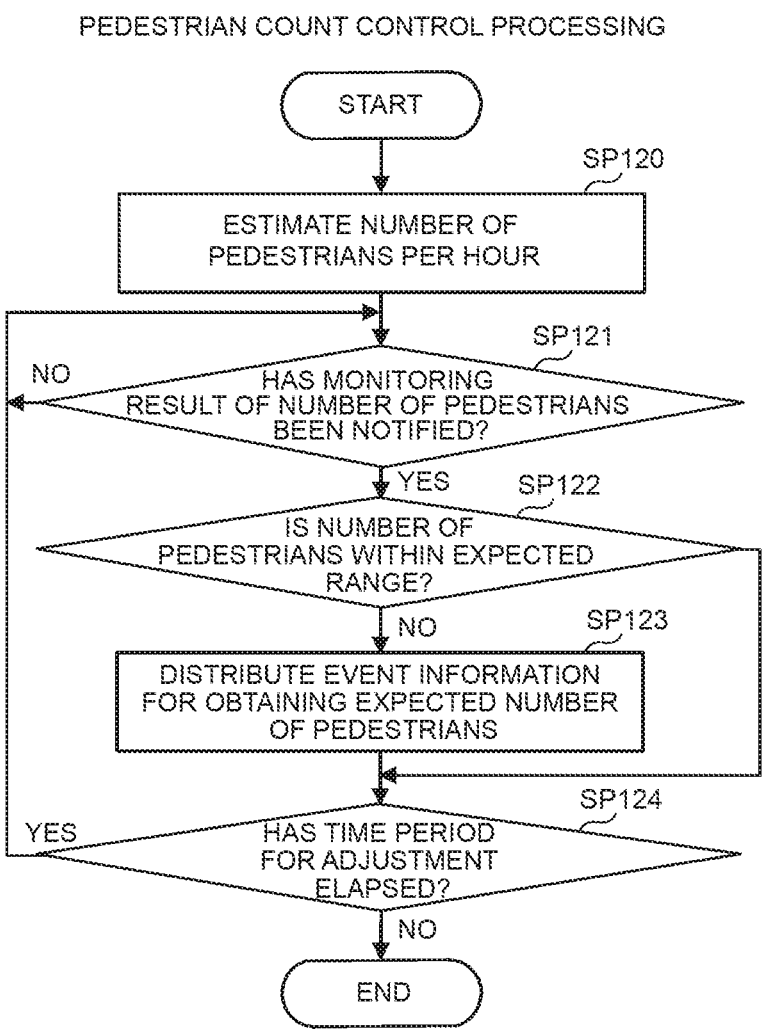
FIG. 28 is a flowchart showing the processing routine of the pedestrian count control processing.

FIG. 28 shows the processing contents of the pedestrian count control processing to be executed by the human flow control unit 43 (FIG. 2) of the information distribution apparatus 3 in relation to the pedestrian count control method.

The human flow control unit 43 starts the pedestrian count control processing when the information distribution apparatus 3 is operated and the execution order of the pedestrian count control processing is input, and foremost estimates the number of pedestrians on the target street per hour based on the processing results of the foregoing clustering processing and profiling processing performed to the time series position data of the respective mobile terminals 2 (SP120). Since the processing results in step SP120 are the same as step SP110 of the store staff count/store customer count control processing described above with reference to FIG. 27, the detailed explanation thereof is omitted.

Subsequently, the human flow control unit 43 waits to receive the monitoring result of the number of pedestrians on the target street in the time period to be analyzed (SP121). Note that the monitoring of the number of pedestrians may be performed manually, or may be automatically performed by placing a monitoring camera of an object detection sensor along the street, and processing the video output from the monitoring camera. In this embodiment, the number of pedestrians per unit time that was monitored as described above is manually notified on a regular basis or automatically notified to the information distribution apparatus 3.

When the human flow control unit 43 is notified of the number of pedestrians per unit time, the human flow control unit 43 performs step SP122 to step SP124 in the same manner as the processing of step SP113 to step SP115 of the store staff count/store customer count control processing described above with reference to FIG. 27. When the human flow control unit 43 eventually obtains a positive result in step SP124 as a result of the time period of analyzing the number of pedestrians elapsing, the human flow control unit 43 ends the pedestrian count control processing.

(4) Effect of this Embodiment

As described above, the information distribution apparatus 3 of this embodiment classifies the mobile information (time series position data) of a plurality of users into a plurality of clusters based on the clustering processing by using the attribute information of users, determines a dominant user attribute for each of the classified clusters based on the profiling processing, and distributes, for each cluster, the distribution information to the users in which the time series position data is affiliated with that cluster, based on the attribute determined for each cluster.

Thus, according to the information distribution apparatus 3, information can be distributed in cluster units, and it is also possible to distribute, for each cluster, information which is optimal to the cluster-affiliated users among the information registered in the distribution candidate information table 29. Therefore, information can be distributed efficiently with fewer information processing resources in comparison to cases of distributing information to each and every user.

Moreover, generally speaking, in order to improve the distribution effect of service information, it is necessary to evaluate the changes in the user's actions that occur due to the distribution of service information to the user. However, since there are variations in the changes in the user's actions that occur due to the distribution of service information, it is difficult to perform a uniform evaluation targeting all users.

Nevertheless, because the information distribution apparatus 3 distributes the information in cluster units as described above and evaluates the distribution effect in cluster units, it is possible to perform a uniform evaluation targeting all users.

(5) Other Embodiments

Note that, while the foregoing embodiment explained a case where the mobile communication object is a mobile communication terminal device such as the mobile terminal 2, the present invention is not limited thereto, and, for example, the present invention can also be applied to a mobile communication object such as a car navigation system other than a mobile communication terminal device.

Moreover, while the foregoing embodiment explained a case where the human flow control based on an information distribution event was applied to the control of number of visitors to a store and the control of the number of pedestrians on a street, the present invention is not limited thereto, and the present invention may also be broadly applied to various types of human flow control.

Furthermore, while the foregoing embodiment explained a case where the positioning device 14 is mounted on the mobile communication object so that its position can be acquired by the positioning device 14, the present invention is not limited thereto, and, for example, and the configuration may be such that the position of the respective mobile communication objects is detected based on a sensor or means other than the positioning device 14, and the configuration may also be such that the mobile communication object is not equipped with a function of measuring its own position, and the position of the respective mobile communication objects is measured by an external device such as an external monitoring camera, and the results (position information of the respective mobile communication objects) are collected by the information distribution apparatus 3.

Furthermore, while the foregoing embodiment explained a case where the Fourier transformation was applied as the transformation method of transforming the respective time series position data into frequency data of a frequency domain upon performing the clustering processing, the present invention is not limited thereto, and, for example, transformation methods such as wavelength transformation other than Fourier transformation may also be broadly applied.

Furthermore, while the foregoing embodiment explained a case where the position information (including time series position data) collected by the information distribution apparatus 3 from the respective mobile terminals 2 was configured from only the two coordinate values of latitude and longitude, the present invention is not limited thereto, and, for example, when the position information (including time series position data) includes data values related to a plurality of coordinate axes such as the latitude and longitude and height, the time series position data may be transformed into the complex number data by allocating the data values to either a real part or an imaginary part.

Furthermore, while the foregoing embodiment explained a case where the information distribution event determination/execution unit 22 (FIG. 2) of the information distribution apparatus 3 determined the information to be distributed among the information registered in the distribution candidate information table 29 (FIG. 8) and then distributed the determined information, the present invention is not limited thereto, and, for example, the information distribution event determination/execution unit 22 may also distribute, to the respective users, the representative moving route of the cluster with which that user is affiliated (for example, the route that is defined based on the time series position date of the cluster centroid of that cluster) or information related to facilities on such representative moving route (restaurants, commercial stores, accommodation facilities).

INDUSTRIAL APPLICABILITY

The present invention can be broadly applied to information distribution apparatuses which distribute information to mobile communication objects equipped with a positioning function for acquiring the position data of one's current position.

REFERENCE SIGNS LIST

1: information distribution system
2: mobile terminal
3: information distribution apparatus
10, 15 CPU
11, 16: storage device
14: positioning device
24: user position information table
25: user classification information table
26: user attribute information database
27: candidate attribute table
28: per-cluster attribute information table
29: distribution candidate information table
30: information distribution event score information table
20: clustering processing unit
21: profiling processing unit
22: information distribution event determination/execution unit
23: information distribution event evaluation unit
TR: diagnostic decision tree

The invention claimed is:

1. An information distribution apparatus which distributes information to a plurality of mobile communication objects, comprising:
an input/output device;
a storage device comprising at least a clustering processing program, a profiling processing program, an information distribution event determination/execution program; and
a central processing unit which executes:
the clustering processing program, stored in a clustering processing unit, by collecting time series position data, which is time series position information of each of the mobile communication objects, transforms the time series position data collected from each of the mobile communication objects into frequency data of a frequency domain, generates a feature value based on the corresponding frequency data for each of the time series position data, and classifies each of the time series position data into a plurality of the clusters based on the generated feature value of each of the time series position data;
the profiling processing program stored in a profiling processing unit, by determining, for each of the clusters, a dominant attribute of each user in which the time series position data was allocated to a relevant cluster based on pre-registered attribute information of each of the users of each of the mobile communication objects;
the information distribution event determination/execution program stored in an information distribution event determination/execution unit, by determining, for each of the clusters, information to be distributed to each of the users in which the time series position data was allocated to the relevant cluster based on a processing result of the profiling processing.

2. The information distribution apparatus according to claim 1,
wherein each of the mobile communication objects comprises:
a positioning device which measures its own position, and
wherein the central processing unit via the clustering processing unit:
collects, from each of the mobile communication objects, the time series position information measured by the positioning device of the mobile communication object as the time series position data.

3. The information distribution apparatus according to claim 1,
wherein the central processing unit via the clustering processing unit:
transforms each of the target time series position data into complex number data in which a plurality of data values related to a coordinate system of the relevant time series position data are each allocated to a real part or an imaginary part, and transforms each of the complex number data into the frequency data, and thereby transforms each of the time series position data into the frequency data.

4. The information distribution apparatus according to claim 1,
wherein the central processing unit via the clustering processing unit:
transforms each of the target time series position data into complex number data in which a first component of a plurality of data values related to a coordinate system of the relevant time series position data is a real part and a second component of a plurality of data values related to a coordinate system of the relevant time series position data is an imaginary part, and transforms each of the complex number data into the frequency data, and thereby transforms each of the time series position data into the frequency data.

5. The information distribution apparatus according to claim 1,
wherein the position data is configured from latitude data representing a latitude and longitude data representing a longitude, and
wherein the central processing unit via the clustering processing unit:
transforms each of the target time series position data into complex number data in which the latitude data is a real part and the longitude data is an imaginary part, or the latitude data is an imaginary part and the longitude data is a real part, and transforms each of the complex number data into the frequency data, and thereby transforms each of the time series position data into the frequency data.

6. The information distribution apparatus according to claim 1,
wherein the central processing unit via the clustering processing unit:
transforms frequency data of a centroid of each of the clusters into time series position information of a time domain, and
displays, for each of the clusters, a trajectory of the centroid based on the time series position information obtained from the transformation in a three-dimensional spatial coordinate having axes of latitude, longitude and time.

7. The information distribution apparatus according to claim 1,
wherein the central processing unit via the profiling processing unit:
determines the dominant attribute of the user in which the time series position data is allocated to each of the clusters based on decision tree learning.

8. The information distribution apparatus according to claim 1, further comprising:
the central processing unit further comprised to execute a fourth program, stored in an information distribution event evaluation unit, which evaluates an effect of information distribution by the information distribution event determination/execution unit.

9. The information distribution apparatus according to claim 8,
wherein the central processing unit via the information distribution event evaluation unit:
causes the clustering processing unit to execute the clustering processing and causes the profiling processing unit to execute the profiling processing after the information is distributed, and
evaluates, for each of the clusters before the information is distributed, an effect of the information distribution based on a distance between centroids between the clusters having a same attribute among the clusters after the information is distributed.

10. The information distribution apparatus according to claim 1, further comprising:
the central processing unit further comprised to execute a fifth program, stored in a human flow control unit which:
estimates a number of visitors to a store or a number of pedestrians on a street on an hourly basis based on a processing result of the clustering processing and a processing result of the profiling processing, and
controls the number of visitors to the store or the number of pedestrians on the street by causing the information distribution event determination/execution unit to distribute the information as needed based on an estimation result.

11. The information distribution apparatus according to claim 1,
wherein the central processing unit via the clustering processing unit:
transforms the frequency data upon interpolating a data unavailability period regarding each of the time series position data.

12. The information distribution apparatus according to claim 11,
wherein the central processing unit via the clustering processing unit:
performs linear interpolation to the data unavailability period that is short-term, and interpolates a value of the time series position data immediately after or immediately before the unavailability period regarding the data unavailability period that is long-term.

13. The information distribution apparatus according to claim 1,
wherein the central processing unit via the clustering processing unit:
selects, as a coordinate axis of the time series position data, either an absolute coordinate axis in which the position information configuring time series position data is used as is, or a relative coordinate axis which is based on a default value of the position information configuring the time series position data, and when the relative coordinate axis is selected, transforms the coordinate axis into the relative coordinate axis, and then transforms each of the time series position data into the frequency data.

14. The information distribution apparatus according to claim 1,
wherein the central processing unit via the clustering processing unit:
determines an optimal number of clusters based on a similarity in the cluster and a separability between the clusters, and classifies the time series position data into the clusters in a quantity of the determined number of clusters.

15. The information distribution apparatus according to claim 1,
wherein the central processing unit via the information distribution event determination unit:
determines, for each of the clusters, based on attributes registered in advance, a plurality of pieces of information to be distributed to each of the users in which the time series position data is allocated to the relevant cluster, and distributes the information to each of the users.

16. The information distribution apparatus according to claim 15,
wherein the central processing unit via the information distribution event determination unit:
distributes, to each of the users, for each of the clusters, a representative moving route of each of the users in which the time series position data is allocated to the relevant cluster, and information related to a facility on the moving route.

17. An information distribution method to be executed in an information distribution apparatus which distributes information to a plurality of mobile communication objects, comprising:

executing clustering processing by:
  collecting time series position data, which is time series position information measured by positioning devices of each of the mobile communication objects;
  transforming the time series position data collected from each of the mobile communication objects into frequency data of a frequency domain, and
  generating a feature value based on the corresponding frequency data for each of the time series position data;
  classifying each of the time series position data into a plurality of the clusters based on the generated feature value of each of the time series position data;
executing profiling processing of determining, for each of the clusters, a dominant attribute of each user in which the time series position data was allocated to the relevant cluster based on pre-registered attribute information of each of the users of each of the mobile communication objects; and
determining, for each of the clusters, information to be distributed to each of the users in which the time series position data was allocated to the relevant cluster based on a processing result of the profiling processing.

* * * * *